(12) United States Patent
Yoo

(10) Patent No.: US 9,337,746 B2
(45) Date of Patent: May 10, 2016

(54) MULTILEVEL INVERTER

(71) Applicant: LSIS CO., LTD., Anyang-si, Gyeonggi-do (KR)

(72) Inventor: Anno Yoo, Seoul (KR)

(73) Assignee: LSIS CO., LTD., Anyang-si (KR)

( * ) Notice: Subject to any disclaimer, the term of this patent is extended or adjusted under 35 U.S.C. 154(b) by 89 days.

(21) Appl. No.: 14/227,447

(22) Filed: Mar. 27, 2014

(65) Prior Publication Data

US 2014/0307497 A1 Oct. 16, 2014

(30) Foreign Application Priority Data

Apr. 10, 2013 (KR) ........................ 10-2013-0038940

(51) Int. Cl.
*H02M 7/483* (2007.01)
*H02M 7/49* (2007.01)
*H02M 7/487* (2007.01)

(52) U.S. Cl.
CPC ................. *H02M 7/483* (2013.01); *H02M 7/49* (2013.01); *H02M 7/487* (2013.01)

(58) Field of Classification Search
CPC .............. H02M 2007/53876; H02M 7/5395; H02M 7/487; H02M 1/32; H02P 27/14
USPC ............... 363/17, 37, 41, 43, 71, 69
See application file for complete search history.

(56) References Cited

U.S. PATENT DOCUMENTS

| | | | |
|---|---|---|---|
| 5,969,966 A | 10/1999 | Sawa et al. | |
| 6,058,031 A * | 5/2000 | Lyons | H02M 7/487 363/132 |
| 6,229,722 B1 * | 5/2001 | Ichikawa et al. | 363/71 |
| 7,508,147 B2 * | 3/2009 | Rastogi | H02M 5/458 318/376 |
| 7,830,681 B2 * | 11/2010 | Abolhassani et al. | 363/37 |
| 7,834,579 B2 * | 11/2010 | Nojima | 318/801 |
| 8,223,515 B2 * | 7/2012 | Abolhassani | H01F 27/385 363/34 |
| 8,553,432 B2 * | 10/2013 | Komulainen | H02M 5/225 318/599 |

(Continued)

FOREIGN PATENT DOCUMENTS

| | | |
|---|---|---|
| CN | 101860248 | 10/2010 |
| CN | 102763316 | 10/2012 |

(Continued)

OTHER PUBLICATIONS

Japan Patent Office Application Serial No. 2014-079928, Office Action dated Jan. 27, 2015, 3 pages.

(Continued)

*Primary Examiner* — Rajnikant Patel
(74) *Attorney, Agent, or Firm* — Lee Hong Degerman Kang & Waimey; Jonathan Kang; Jeffrey Lotspeich

(57) ABSTRACT

A multilevel inverter having an efficient structure is provided, the multilevel inverter including a modularized phase-shift transformer including a plurality of modules to provide a phase shifted voltage by receiving a 3-phase input voltage, a plurality of first group unit power cells configured to provide an output voltage of predetermined phase, a plurality of second group unit power cells configured to provide an output voltage of predetermined phase, a plurality of third group unit power cells configured to provide an output voltage of predetermined phase. One of the first group unit power cells, one of the second group unit power cells and one of the third group unit power cells are paired to provide an output voltage of same phase.

17 Claims, 20 Drawing Sheets

(56) References Cited

U.S. PATENT DOCUMENTS

| | | |
|---|---|---|
| 2004/0145337 A1 | 7/2004 | Morishita |
| 2010/0073970 A1 | 3/2010 | Abolhassani et al. |
| 2010/0213921 A1 | 8/2010 | Abolhassani et al. |
| 2013/0014384 A1 | 1/2013 | Xue et al. |

FOREIGN PATENT DOCUMENTS

| | | |
|---|---|---|
| EP | 2575249 | 4/2013 |
| JP | 2000-050636 | 2/2000 |
| JP | 2004-229493 | 8/2004 |
| JP | 2008-193779 | 8/2008 |
| WO | 2005124961 | 12/2005 |

OTHER PUBLICATIONS

European Patent Office Application Serial No. 14162322.3, Search Report dated Jun. 18, 2015, 9 pages.

Chinese Patent Office Application Serial No. 201410143736.4, Office Action dated Mar. 2, 2016, 10 pages.

* cited by examiner

MULTILEVEL INVERTER

CROSS REFERENCE TO RELATED APPLICATION

Pursuant to 35 U.S.C. §119 (a), this application claims the benefit of earlier filing date and right of priority to Korean Patent Application No. 10-2013-0038940, filed on Apr. 10, 2013, the contents of which is hereby incorporated by reference in their entirety.

BACKGROUND OF THE DISCLOSURE

1. Field

The teachings in accordance with the exemplary embodiments of this present disclosure generally relate to a multilevel inverter, and more particularly to a multilevel medium voltage inverter configured to use a unit power cell.

2. Background

In general, a multilevel medium voltage inverter is an inverter having an input power whose rms (root mean square) value is over 600V for a line-to-line voltage, and has several stages in output phase voltage. The multilevel medium voltage inverter is generally used to drive an industrial load of large inertia ranging from several kW to several MW capacities of, for a non-limiting example, fans, pumps, compressors, tractions, hoists and conveyors.

One form of multilevel inverter is a Cascaded H-Bridge (CHB) inverter architecture, which employs multiple series-connected H-Bridge inverters for driving each motor winding phase, or a cascaded NCP (Neutral Point Clamped) inverter transformed from the CHB inverter. The recently used NCP inverter is advantageous over the conventional series-connected CHB inverter due to smaller size. The multilevel inverter widely used in various fields requires a higher efficiency and a topology of smaller number of elements.

SUMMARY OF THE DISCLOSURE

The present disclosure is to provide a multilevel inverter configured to have a higher efficiency of structure.

In one general aspect of the present disclosure, there is provided a multilevel inverter, the multilevel inverter comprising:

a modularized phase-shift transformer including a plurality of modules to provide a phase shifted voltage by receiving a 3-phase input voltage;

a plurality of first group unit power cells configured to provide an output voltage of predetermined phase by performing a predetermined inverting operation by receiving a signal corresponding to each phase of a first phase voltage from any one module in the plurality of modules;

a plurality of second group unit power cells configured to provide an output voltage of predetermined phase by performing a predetermined inverting operation through receipt of a signal corresponding to each phase of a second phase voltage from any one module in the plurality of modules;

a plurality of third group unit power cells configured to provide an output voltage of predetermined phase by performing a predetermined inverting operation by receiving a signal corresponding to each phase of a third phase voltage from any one module in the plurality of modules; wherein one of the first group unit power cells, one of the second group unit power cells and one of the third group unit power cells are paired to provide an output voltage of same phase.

Preferably, but not necessarily, the modularized phase shift transformer may comprise a first module configured to provide a first phase voltage phase-shifted by a primary winding and a secondary winding by receiving a 3-phase input voltage, a second module configured to provide a second phase voltage phase-shifted by a primary winding and a secondary winding for shifting a phase differently predetermined from the first module by receiving the 3-phase input voltage, and a third module configured to provide a third phase voltage phase-shifted by a primary winding and a secondary winding for shifting a phase differently predetermined from the first and second modules by receiving the 3-phase input voltage.

Preferably, but not necessarily, the primary winding of the second module may a 3-phase wye winding, and the secondary winding of the second module may be a predetermined 3-phase connection, and each of the primary windings of the first and third modules may have a phase value of equal absolute value, and may be wound to have a positive phase and a negative phase.

Preferably, but not necessarily, the first to third modules may be configured to be symmetrical.

Preferably, but not necessarily, the plurality of first group unit power cells may comprise first to third unit power cells configured to provide an output voltage of a predetermined phase by performing a predetermined inverting operation though receipt of a signal corresponding to each phase of the second phase voltage, the plurality of second group unit power cells comprises fourth to sixth unit power cells configured to provide an output voltage of a predetermined phase by performing a predetermined inverting operation though receipt of a signal corresponding to each phase of the third phase voltage, and the plurality of third group unit power cells comprises seventh to ninth unit power cells configured to provide an output voltage of a predetermined phase by performing a predetermined inverting operation though receipt of a signal corresponding to each phase of the third phase voltage, wherein one of the first to third group unit power cells, one of the fourth to sixth group unit power cells and one of the seventh to ninth group unit power cells are paired to provide an output voltage of same phase.

Preferably, but not necessarily, the first unit power cell may comprise a rectifier configured to provide a first rectifying voltage rectified by receiving a first phase of the first phase voltage, a smoothing unit configured to provide voltages of mutually different levels to mutually different first to third nodes by receiving the first rectifying voltage rectified by the rectifier, and an inverter unit formed with a plurality of switches for transmitting voltages of three levels provided by the smoothing unit, wherein the inverter unit comprises a first switch unit interposed between the first node and a first output terminal, second switch units interposed between the second node and the first output terminal, a third switch unit interposed between the third node and the first output terminal, a fourth switch unit interposed between the first node and a second output terminal, fifth switch units interposed between the second node and the second output terminal and a sixth switch unit interposed between the third node and the second output terminal.

Preferably, but not necessarily, the first to sixth switch units may comprise a power semiconductor and a diode.

Preferably, but not necessarily, the second switch unit may comprise a first diode having a current directivity from the second node to the first output terminal, a first power semiconductor having a current flow directivity reverse from that of the first diode, a second diode having a current flow directivity reverse from that of the first diode and serially connected to the first diode, and a second power semiconductor having a current flow directivity reverse from that of the first power semiconductor and connecting one side to the other side of the second diode.

Preferably, but not necessarily, the first switch unit may comprise a first diode having a current flow directivity from the first output terminal to the first node, and a first power semiconductor having a current flow directivity reverse from that of the first diode and connecting one side to the other side of the first diode.

Preferably, but not necessarily, the third switch unit may comprise a second diode having a current flow directivity from the third node to the first output terminal, and a second power semiconductor having a current flow directivity reverse from that of the second diode and connecting one side to the other side of the second diode.

Preferably, but not necessarily, the fifth switch unit may comprise a first diode having a current directivity from the second node to the second output terminal, a first power semiconductor having a current flow directivity reverse from that of the first diode and connecting one side to the other side of the first diode, a second diode having a current flow directivity reverse from that of the first diode and serially connected to the first diode, and a second power semiconductor having a current flow directivity reverse from that of the first power semiconductor and connecting one side to the other side of the second diode.

Preferably, but not necessarily, the fourth switch unit may comprise a first diode having a current flow directivity from the second output terminal to the first node, and a first power semiconductor having a current flow directivity reverse from that of the first diode and connecting one side to the other side of the first diode.

Preferably, but not necessarily, the sixth switch unit may comprise a second diode having a current flow directivity from the third node to the second output terminal, and a second power semiconductor having a current flow directivity reverse from that of the second diode and connecting one side to the other side of the second diode.

Preferably, but not necessarily, the smoothing unit may comprise serially-connected first and second capacitors, wherein the first and second capacitors receive the first rectifying voltage from one side and the other side, and wherein one side node, a common node and the other side node of the first and second capacitors are respectively the first to third nodes.

Preferably, but not necessarily, the rectifier may comprise first and second diodes connecting one sides and the other sides of the first and second capacitors, and receiving a first phase voltage of the first phase voltage through a common node, third and fourth diodes connecting one sides and the other sides of the first and second capacitors and receiving a second phase voltage of the first phase voltage through a common node, and fifth and sixth diodes connecting one side and the other side of the first capacitor and receiving a third phase voltage of the first phase voltage through a common node.

In another general aspect of the present disclosure, there is provided a multilevel inverter, the multilevel inverter comprising:

a modularized phase shift transformer including a first module configured to provide a first phase voltage phase-shifted by a primary winding and a secondary winding by receiving a 3-phase input voltage, a second module configured to provide a second phase voltage phase-shifted by a primary winding and a secondary winding for shifting a phase differently predetermined from the first module by receiving the 3-phase input voltage, a third module config- ured to provide a third phase voltage phase-shifted by a primary winding and a secondary winding for shifting a phase differently predetermined from the first and second modules by receiving the 3-phase input voltage, and a fourth module configured to provide a fourth phase voltage phase-shifted by a primary winding and a secondary winding for shifting a phase differently predetermined from the first to third modules by receiving the 3-phase input voltage; first to third unit power cells configured to provide an output voltage of a predetermined phase by performing a predetermined inverting operation though receipt of a signal corresponding to each phase of the first phase voltage; fourth to sixth unit power cells configured to provide an output voltage of a predetermined phase by performing a predetermined inverting operation though receipt of a signal corresponding to each phase of the second phase voltage, seventh to ninth unit power cells configured to provide an output voltage of a predetermined phase by performing a predetermined inverting operation though receipt of a signal corresponding to each phase of the third phase voltage; and tenth to twelfth unit power cells configured to provide an output voltage of a predetermined phase by performing a predetermined inverting operation though receipt of a signal corresponding to each phase of the fourth phase voltage, wherein one of the first to third group unit power cells, one of the fourth to sixth group unit power cells, one of the seventh to ninth group unit power cells and one of tenth to twelfth unit power cells are paired to provide an output voltage of same phase.

Preferably, but not necessarily, the first unit power cell may comprise a rectifier configured to provide a first rectifying voltage rectified by receiving a first phase of the first phase voltage, a smoothing unit configured to provide voltages of mutually different levels to mutually different first to third nodes by receiving the first rectifying voltage rectified by the rectifier, and an inverter unit formed with a plurality of switches for transmitting voltages of three levels provided by the smoothing unit, wherein the inverter unit comprises a first switch unit interposed between the first node and a first output terminal, second switch units interposed between the second node and the first output terminal, a third switch unit interposed between the third node and the first output terminal, a fourth switch unit interposed between the first node and a second output terminal, fifth switch units interposed between the second node and the second output terminal and a sixth switch unit interposed between the third node and the second output terminal.

Preferably, but not necessarily, the smoothing unit may comprise serially-connected first to fourth capacitors, wherein the first to fourth capacitors receive the first to fourth rectifying voltages from one side and the other side of the first to fourth capacitors, and wherein one side and the other side of the first and second capacitors are first and second nodes, and the other side of the fourth capacitor is the third node.

Preferably, but not necessarily, the rectifier may comprise first and second diodes connecting one sides and the other sides of the first and second capacitors, and receiving a first phase voltage of the first phase voltage through a common node, third and fourth diodes connecting one sides and the other sides of the first and second capacitors and receiving a second phase voltage of the first phase voltage through a common node, and fifth and sixth diodes connecting one side and the other side of the first capacitor and receiving a third phase voltage of the first phase voltage through a common node.

Advantageous Effects of the Disclosure

The multi-level inverter system according to the present disclosure thus described has an advantageous effect in that a layout freedom is available to reduce the size of entire system and to increase redundancy of the entire system, which can be accomplished by modularization of structure in a phase shift transformer used for an input terminal of the multi-level medium voltage inverter and formation of an input terminal of a unit power cell using a 6-pulse diode.

Another advantageous effect is that a modularized phase shift transformer is used to increase redundancy of an entire system.

Still another advantageous effect is that an operational efficiency can be increased which can be accomplished by the reduced number of averagely-conducted power semiconductor diodes resultant from a changed structure of an inverter unit, and a volume and weight of an entire system can be greatly reduced by allowing a thermal design to easily made, when a conductive loss of the multi-level inverter is reduced.

DETAILED DESCRIPTION OF THE DISCLOSURE

The following embodiments described herein are intended to explain modes known of practicing the disclosure and to easily enable others skilled in the art to utilize the disclosure using the accompanied drawings.

Figure 1:
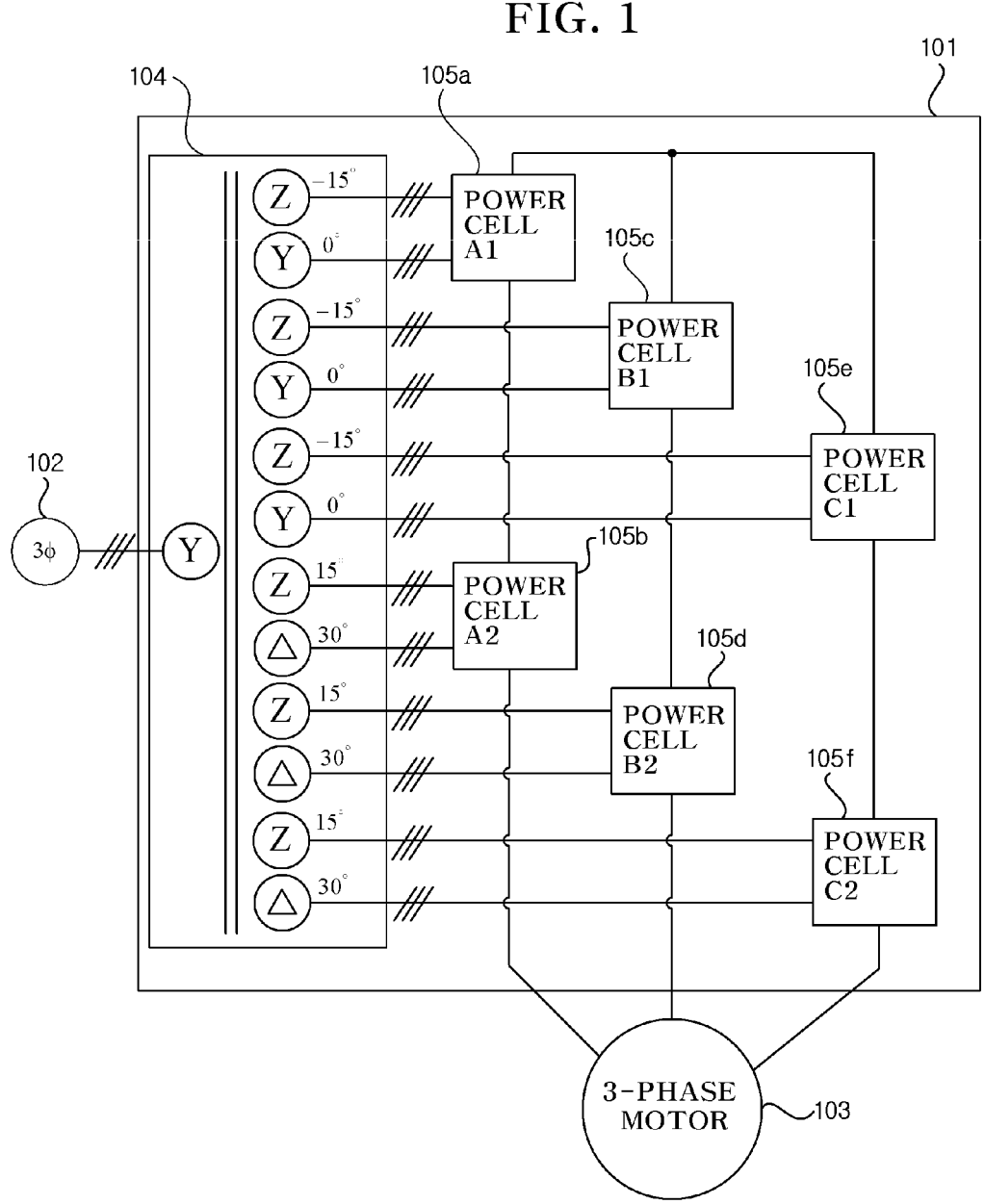
FIG. 1 is a block diagram illustrating an inverter system including a multi-level inverter according to the present disclosure.

FIG. 1 is a block diagram illustrating an inverter system including a multi-level inverter according to the present disclosure.

Referring to FIG. 1, an inverter system (101) including a phase shift transformer and a multi-level medium voltage inverter includes an input 3-phase power (102) a 3-phase motor (103), a phase shift transformer (104) and a unit power cells (105a~105f). The input 3-phase power (102) means an input power whose rms (root mean square) value is over 600V for a line-to-line voltage. The 3-phase motor (103) is a load of an inverter system. A primary winding of the phase shift transformer (104) has a 3-phase wye winding shape, and a secondary winding has a total of 12 windings, each winding having a phase difference of −15°, 0°, 15° and 30° relative to the primary winding. That is, a structure of the secondary winding is determined by the number of power cells in the unit power cells (105a~105f).

Each output voltage of the unit power cells (105a~105f) is 5-level. The 3-phase motor (103) acting as a load is formed with two unit power cells for each phase, and the number of unit power cells is extendible, if necessary. Outputs of the unit power cells (105a and 105b) are serially connected to output an 'a' phase voltage of the loaded 3-phase motor, and the unit power cells (105c and 105d) output a 'b' phase voltage, and the unit power cells (105e and 105f) output a 'c' phase voltage. The unit power cells (105a, 105c, 105e) are connected to outputs having phases of −15° and 0° among the outputs of the phase shift transformer (104), and the unit power cells (105b 105d. 105f) are connected to outputs having phases of 15° and 30° among the outputs of the phase shift transformer (104).

Figure 2:
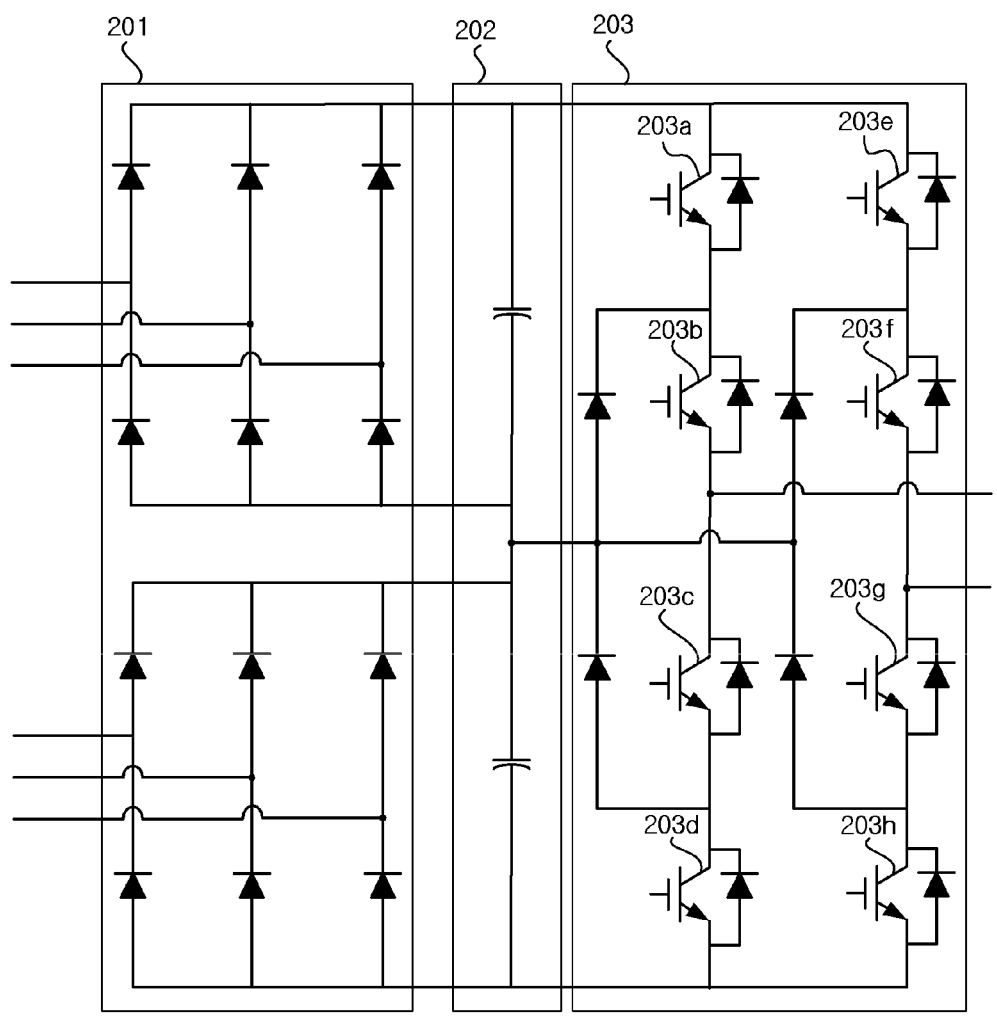
FIG. 2 is a circuit diagram illustrating a structure of each unit power cell illustrated in FIG. 1.

FIG. 2 is a circuit diagram illustrating a structure of each unit power cell illustrated in FIG. 1.

Referring to FIG. 2, a unit power cell includes a diode rectifier (201), a smoothing unit (202), and an inverter unit (203) configured to synthesize output voltages. The diode rectifier (201) receives two 3-phase powers, where an input power is an output voltage of the phase shift transformer (104) of FIG. 1. An output of the diode rectifier (201) is transmitted to two serially-connected DC-link capacitors, where each of the two DC link capacitors has a same capacitance. The inverter unit (203) is configured to synthesize the output voltages, where an outputted line-to-line voltage is 5 levels.

Figure 3:
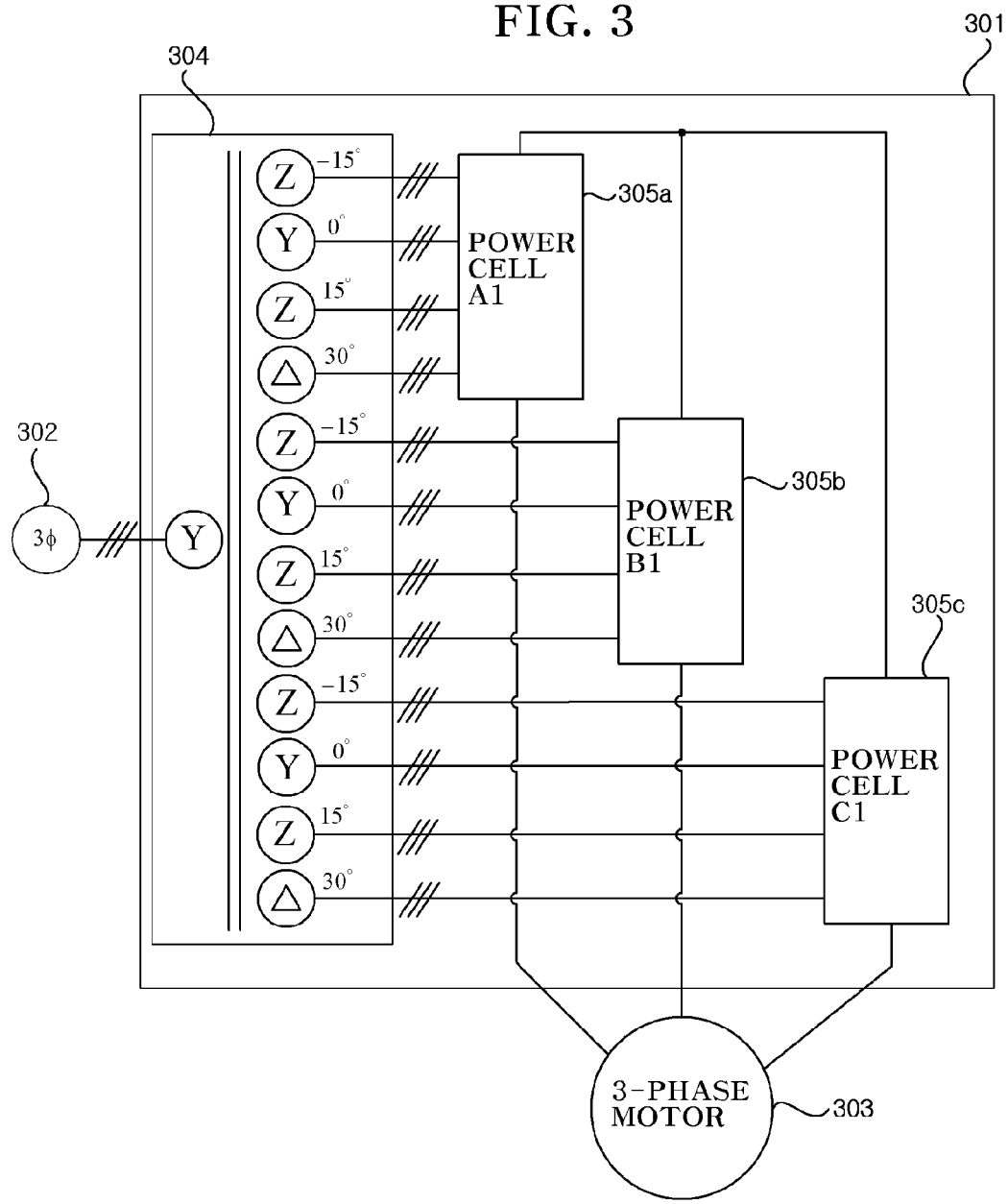
FIG. 3 is a block diagram illustrating an inverter system including another inverter.

FIG. 3 is a block diagram illustrating an inverter system including another inverter.

Referring to FIG. 3, an inverter system (301) includes an input 3-phase power (302), a 3-phase motor (303), a phase shift transformer (304) and unit power cells (305a-305c). The input 3-phase power (302) means an input power whose rms (root mean square) value is over 600V for a line-to-line voltage. The 3-phase motor (303) is a load of the inverter system. A primary winding of the phase shift transformer (304) has a 3-phase wye winding shape, and a secondary winding has a total of 12 windings, each winding having a phase difference of −15°, 0°, 15° and 30° relative to the primary winding. That is, a structure of the secondary winding is determined by the number of power cells in the unit power cells (305a~305c). The unit power cells (305a~305c) can synthesize an output voltage of 5-level. The unit power cell (305a) can output an 'a' phase voltage of the loaded 3-phase motor (303), the unit power cell (305b) can output a 'b' phase voltage, and the unit power cell (305c) can output a 'c' phase voltage.

Figure 4:
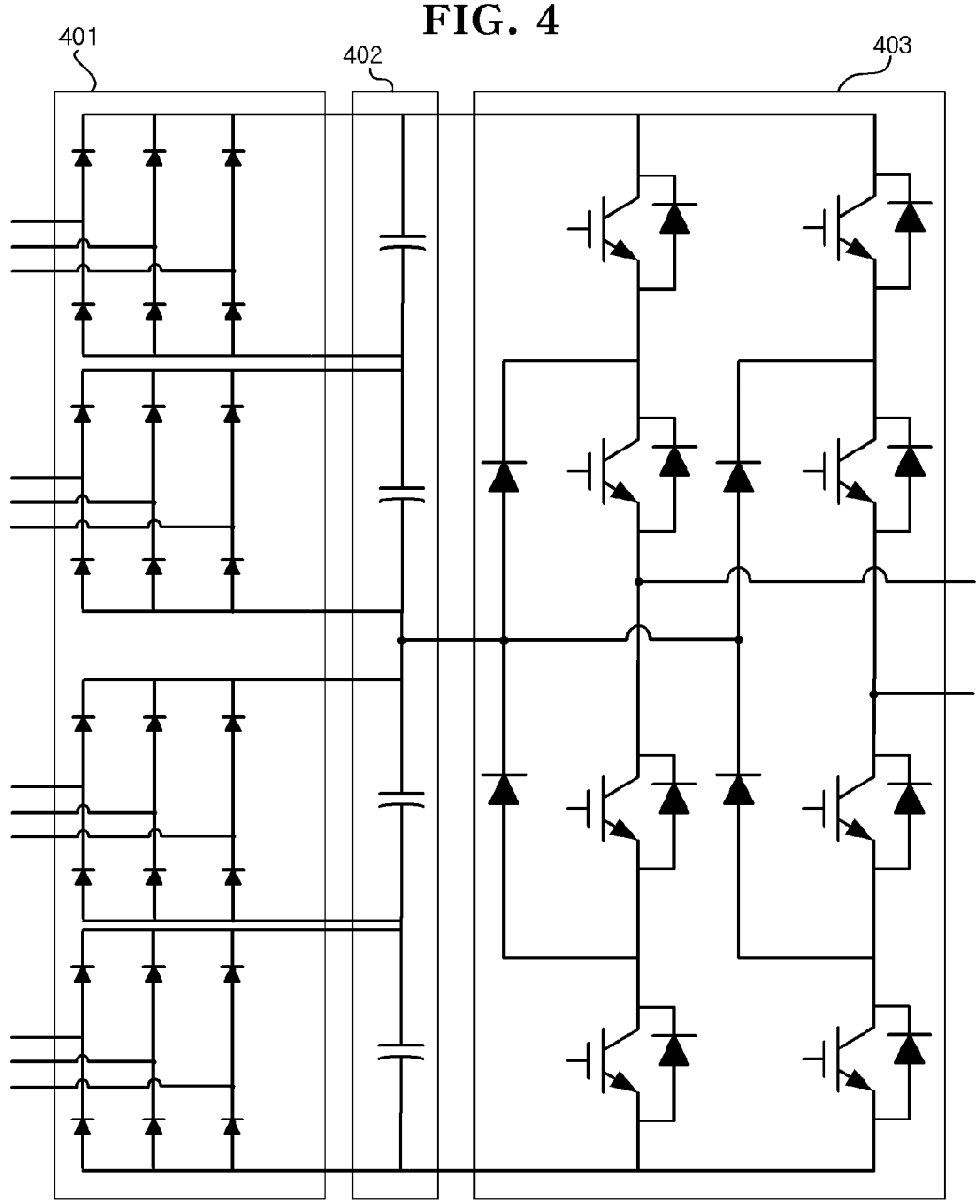
FIG. 4 is a circuit diagram illustrating a structure of each unit power cell illustrated in FIG. 2.

FIG. 4 is an inner circuit diagram illustrating a structure of each unit power cell illustrated in FIG. 3, the diagram including a diode rectifier (401), a smoothing unit (402) and an inverter unit (403) configured to synthesize output voltages. FIG. 4 illustrates four input terminal diode rectifiers (401), and an operation of the inverter unit (403) is same as that of FIG. 2. However, a rated voltage value and a rated current value of power device used for a unit power cell may vary in response to a required output in the unit power cells in FIGS. 2 and 4. The output voltage of the unit power cell can show up to 5 levels.

FIGS. 5 to 10 are circuit diagrams illustrating an operation of an inverter unit illustrated in FIGS. 1 and 2. The operation of the inverter unit will be described with reference to FIGS. 1 to 11. Particularly, the description will be centered on the operation of the inverter unit illustrated in FIGS. 1 and 2.

One leg of the inverter unit (203) illustrated in FIG. 2 is such that four switch units (203a, 203b, 203c, 203d) are serially connected, and an output voltage is defined by the operation of the switch unit.

The operations of the switch units (203a, 203c) are complementary, and the operations of the switch units (203b, 203d) are also complementary. Thus, when it is assumed that the voltages of serially-connected smoothing unit (202) are respectively E, and when the switch units (203*a*, 203*b*) are turned on, the switch units (203*a*, 203*c*) become turned off, and a pole voltage that is outputted at this time becomes E. Furthermore, when the switch units (203*a*, 203*c*) are turned on, the switch units (203*b*, 203*d*) become turned off to make an outputted pole voltage zero. Likewise, when the switch units (203*a*, 203*b*) are turned off, the switch units (203*c*, 203*d*) become turned on to make an outputted pole voltage −E.

When the outputted pole voltage thus defined are used, a line-to-line voltage of each unit cell has 5 levels of 2E, E, 0, −E and −2E. As the line-to-line voltage of each unit cell is defined as 5 levels, a voltage synthesizable by the unit power cells (305*a*, 305*b*) of FIG. 3 now has 9-levels of 4E, 3E, 2E, E, 0, −E, −2E, −3E, −4E, and an output line-to-line voltage of load motor (303) now has 17 levels of 8E, 7E, 6E, 5E, 4E, 3E, 2E, E, 0, −E, −2E, −3E, −4E, −5E, −6E, −7E, −8E.

The PWM method of multi-level medium voltage inverter may be classified to a Phase shifted PWM and a Level shifted PWM based on types of triangular carriers, and the multi-level inverter using the single phase NPC inverter according to the present invention is largely operated by the Level shifted PWM. Furthermore, the level shifted PWM is classified into an IPD (In-phase disposition), an APOD (Alternative phase opposite disposition) and a POD (Phase opposite disposition) based on phase of carrier wave, and the IPD (In-phase disposition) method is generally excellent in terms of harmonics of output voltage. Thus, the level shifted PWM of IPD method will be largely used in the present invention to describe the voltage synthesizing method of multilevel medium voltage inverter.

Now, a conduction state of power semiconductor based on current direction will be as illustrated in FIGS. 5 to 10, when an output pole voltage is determined as E, 0, −E.

Figure 5:
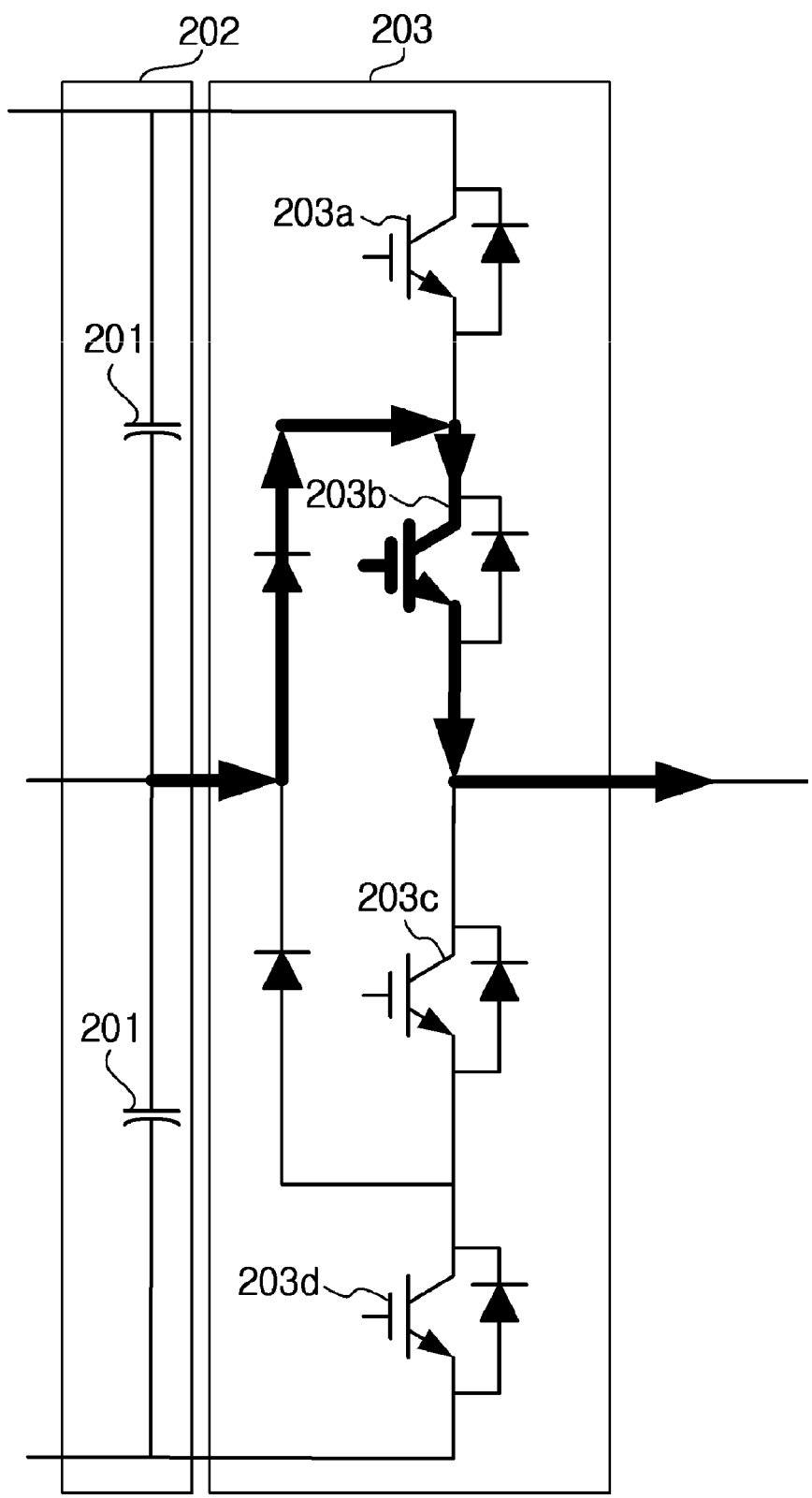
FIGS. 5 to 10 are circuit diagrams illustrating an operation of an inverter unit illustrated in FIG. 2.
Figure 6:
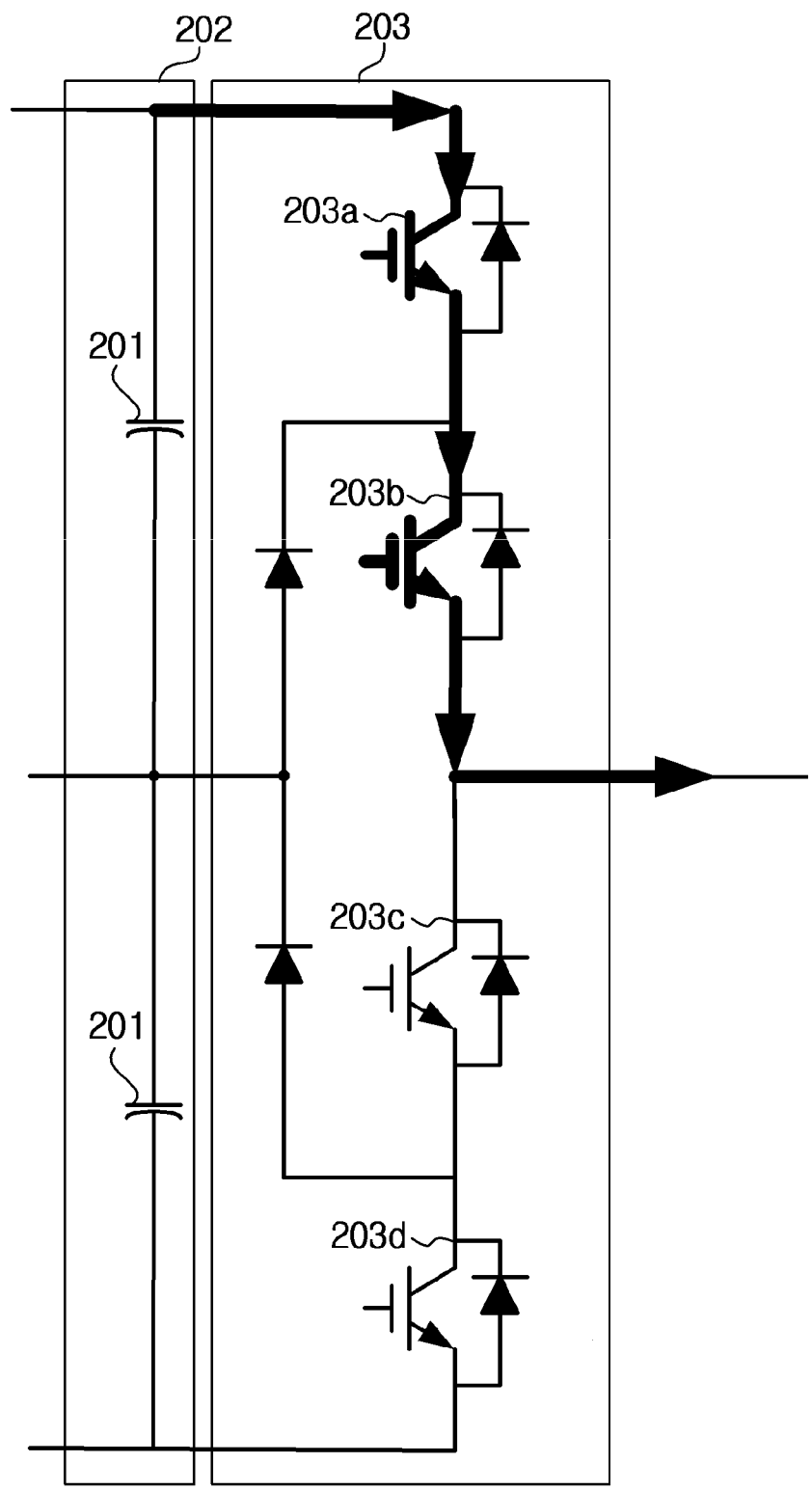
Figure 7:
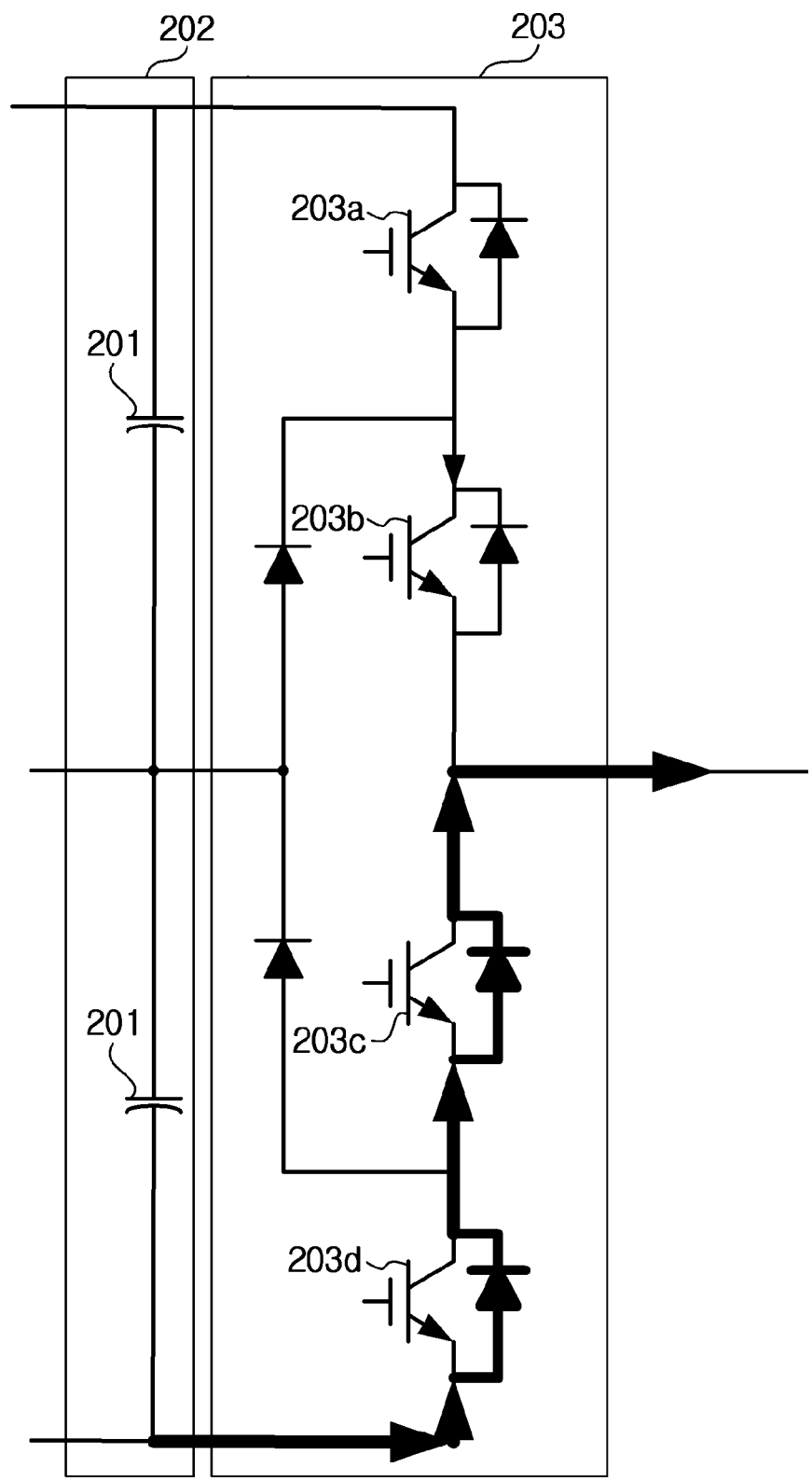

FIG. 5 illustrates a conduction state of a switch unit when an output pole voltage is 0, and an output current is positive, FIG. 6 illustrates a conduction state when an output pole voltage is E and an output current is positive, and FIG. 7 illustrates a conduction state when an output pole voltage is −E and an output current is positive. FIG. 5 illustrates a conduction state where a diode and a switch unit are conducted, FIG. 6 illustrates a conduction state where two switches are conducted, and FIG. 7 illustrates a conduction state where two diodes are conducted.

Figure 8:
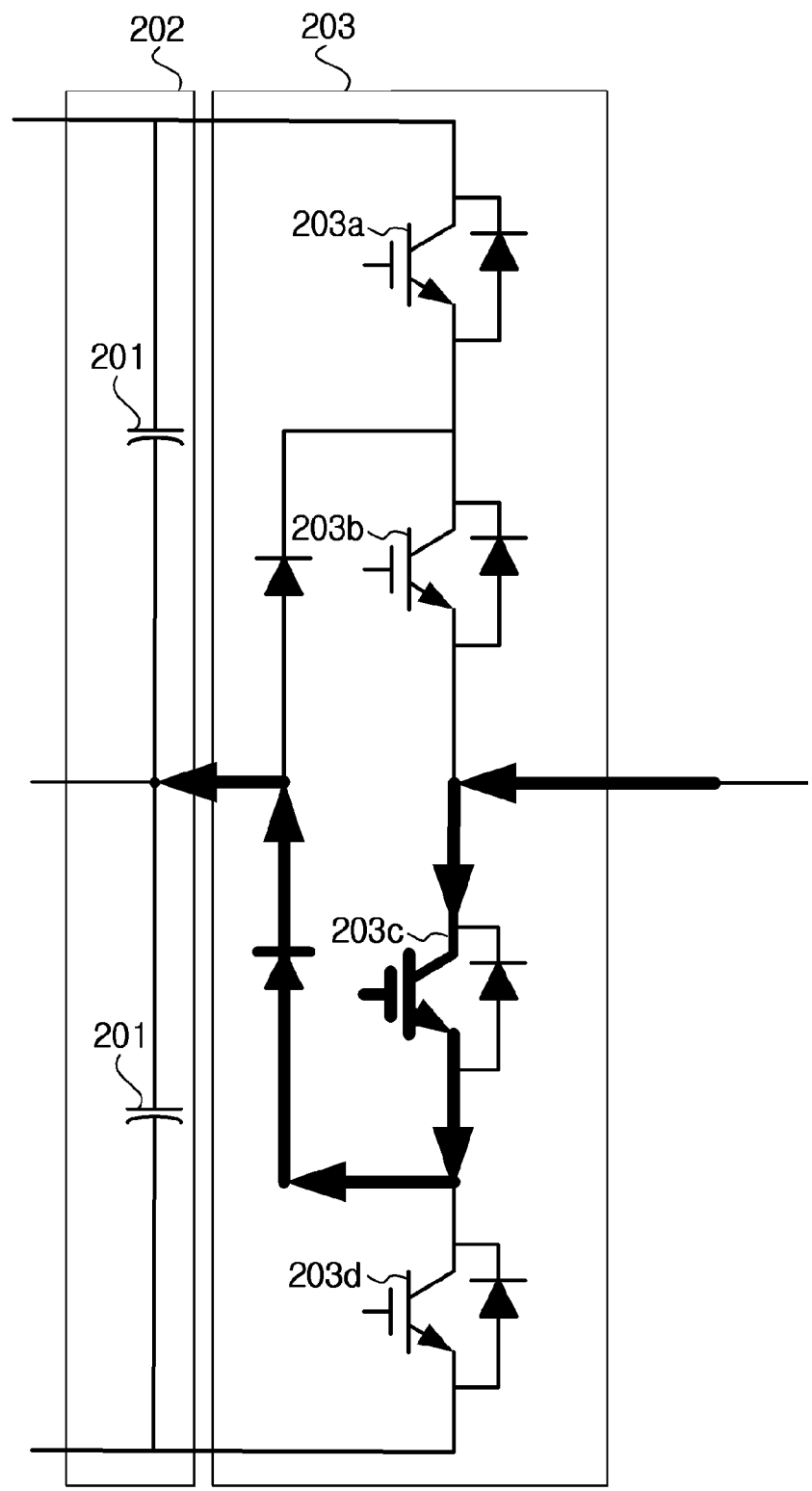
Figure 9:
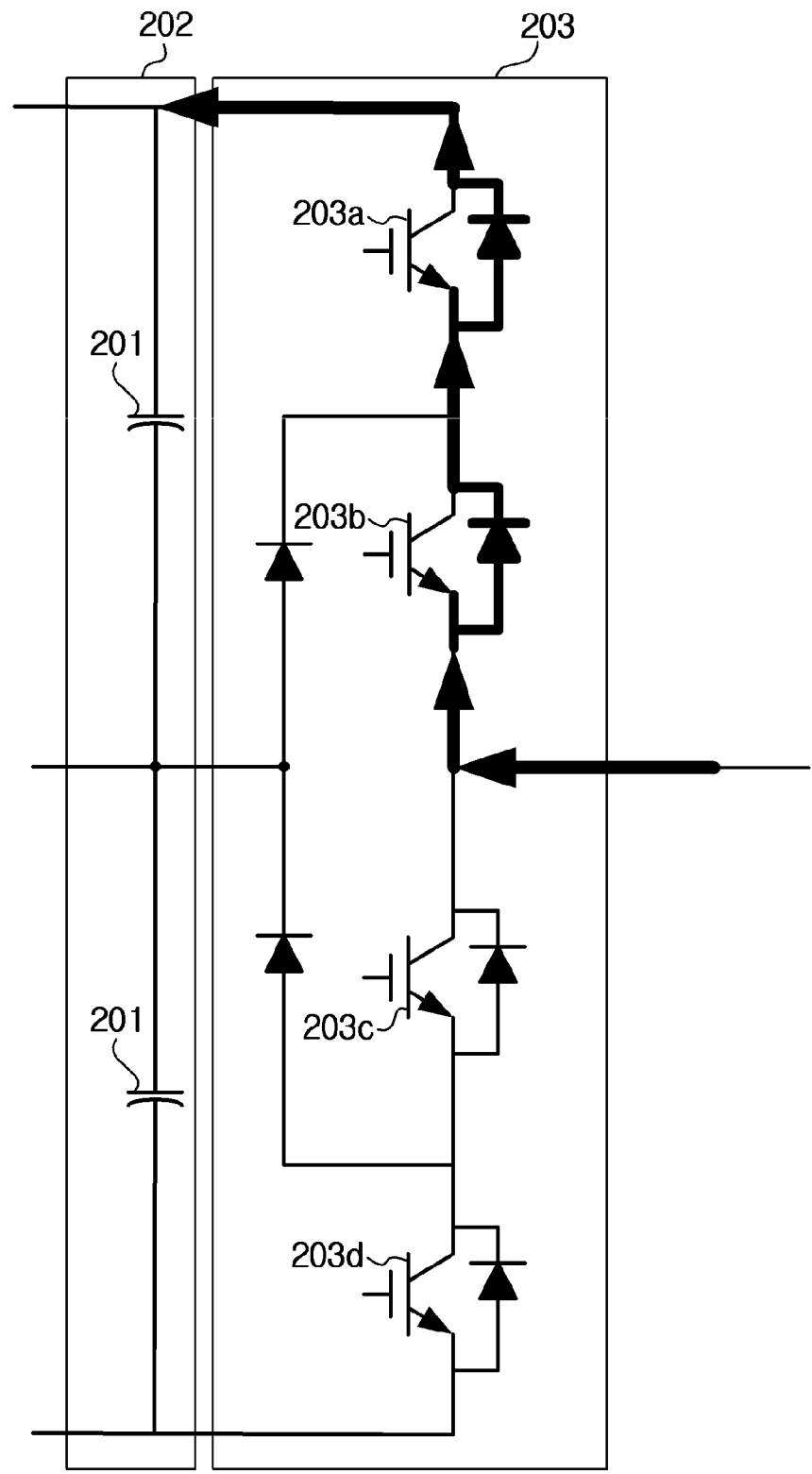
Figure 10:
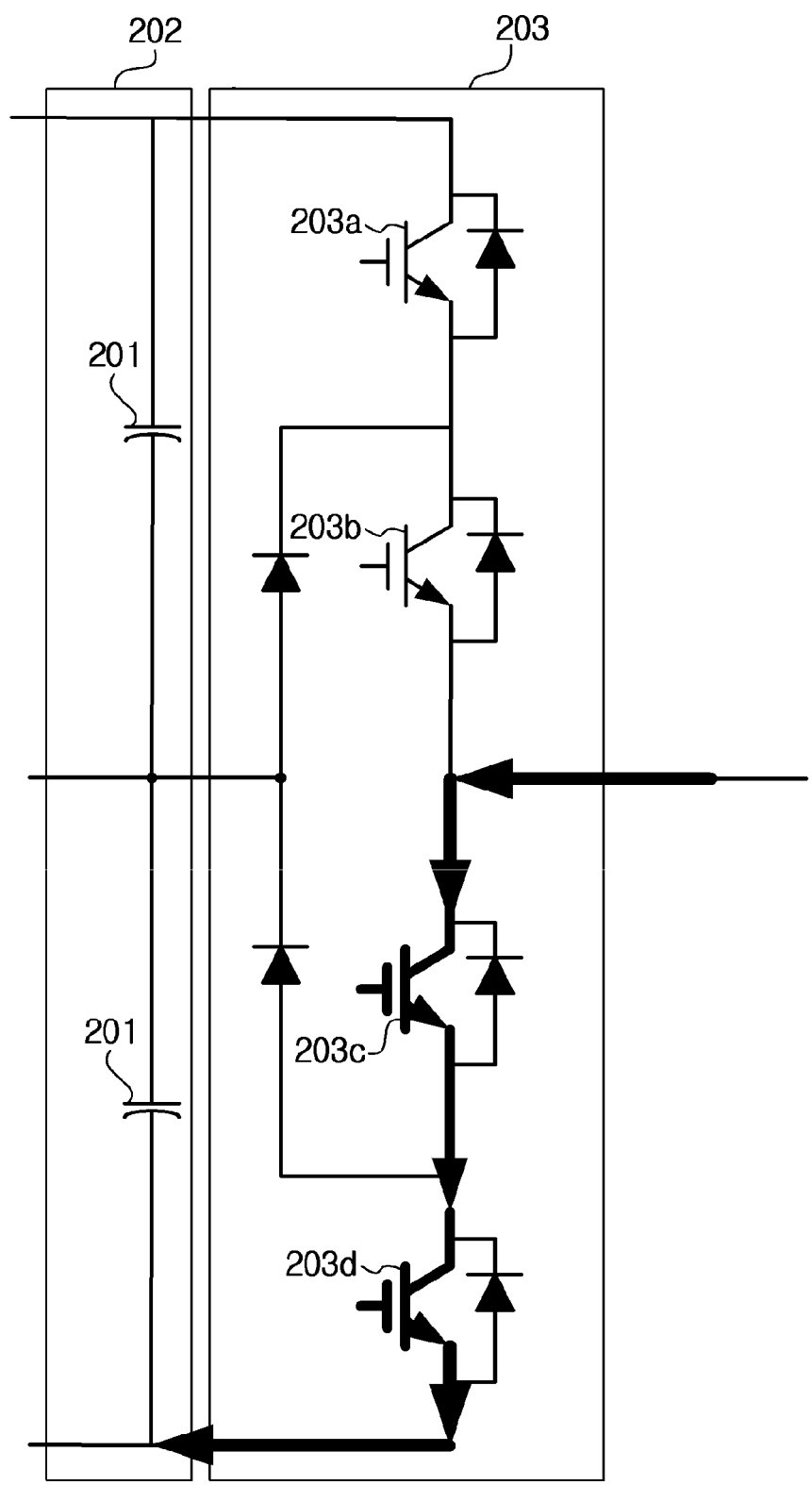

FIG. 8 illustrates a conduction state of a switch unit when an output pole voltage is 0, and an output current is negative, FIG. 9 illustrates a conduction state when an output pole voltage is E, and an output current is negative, and FIG. 10 illustrates a conduction state when an output pole voltage is −E, and an output current is negative. FIG. 8 illustrates a conduction state where a diode and a switch unit are conducted, FIG. 9 illustrates a conduction state where two diodes are conducted, and FIG. 10 illustrates a conduction state where two switch units are conducted.

In succession, an operation of phase shift transformer (104) of FIG. 1 and an operation of phase shift transformer (304) of FIG. 3 will be discussed.

The phase shift transformers (104, 304) apply a 3-phase power having an electrical insulation to each unit power cell from the input 3-phase power (102). At this time, the primary windings of the phase shift transformers (104, 304) have a wye connection or a delta connection, and the secondary windings output a power phase-shifted from the primary winding, where an adequate size of voltage may be outputted to cater to the requirement of the unit power cell.

The outputs of secondary winding of the phase shift transformers (104, 304) correspond to the number of diode rectifiers of the unit power cell to have a relationship in the following manner of Equation 1.

$$N\text{sec}=3N\text{unit}*N\text{diode} \quad (1)$$

where, Nsec is the number of outputs at the secondary winding of the phase shift transformer, Nunit is the number of unit power cells connected to each phase of the load motor, and Ndiode is the number of diode rectifiers mounted at a single unit power cell. For example, Nunit is 2 in a structure of FIG. 1, Ndiode is 2, and Nsec is 12, and Nunit is 1 in a structure of FIG. 3, Ndiode is 4 and Nsec is 12.

A phase shift angle of secondary winding of phase shift transformer according to the present disclosure may be determined by a relationship in the following manner of Equation 2:

$$\alpha_{sec}=360/2N\text{sec}[\text{degree}] \quad (2)$$

where, $\alpha_{sec}$ is a phase shift angle at the secondary winding. For example, in a case Nsec is 12 as in FIGS. 1 and 3, a phase shift angle at the secondary winding is 15°. The phase of each output voltage of secondary winding is changed as much as a phase shift angle relative to an input power voltage at the primary winding based on the phase shift angle at the secondary winding thus determined.

The multi-level medium voltage inverter with a phase shift transformer at an input terminal thus discussed is a single unit type configured only in one 3-phase power at the primary winding with all the secondary windings connected to the unit power cell outputted from one transformer. The output power required by the phase shift transformer of single unit must be satisfied by one single transformer. Thus, the phase shift transformer in a single unit suffers from drawbacks such as increased volume and weight due to weight of the transformer itself, less layout freedom in design, and increased volume of entire system, so that if a problem occurs in the primary winding in the conventional phase shift transformer of single unit, an entire system is rendered inoperable.

The unit power cell is configured with an inverter unit having four diodes, and eight active switches, and the loss of the inverter unit is relatively high because two power semiconductors are conducted at all times during voltage synthesis. Furthermore, the phase shift transformer suffers from another drawback in that the volume increases due to increased number of output terminals at the secondary winding as two or more 3-phase diode rectifiers for unit power cell are required.

Accordingly, a phase shift transformer in a multi-level medium voltage inverter in one single unit is configured to be modularized to provide a layout freedom in design, and to reduce volume and weight of an entire system. Furthermore, another aspect of the present disclosure advantageously provides a modularized phase shift transformer to enable a continuous operation of a load motor in a derated state of reduced output, even if one module is in a fault state.

Still furthermore, the unit power cell used in the inverter system according to the present invention provides a Cascaded T-type NPC (Neutral Point Clamped) inverter configured to reduce a conduction loss compared with the conventional unit power cell. The proposed unit power cell uses a 6-pulse diode rectifier to reduce the number of outputs at the secondary windings, whereby the volume of the phase shift transformer can be reduced to resultantly reduce the volume of an entire system.

Figure 11:
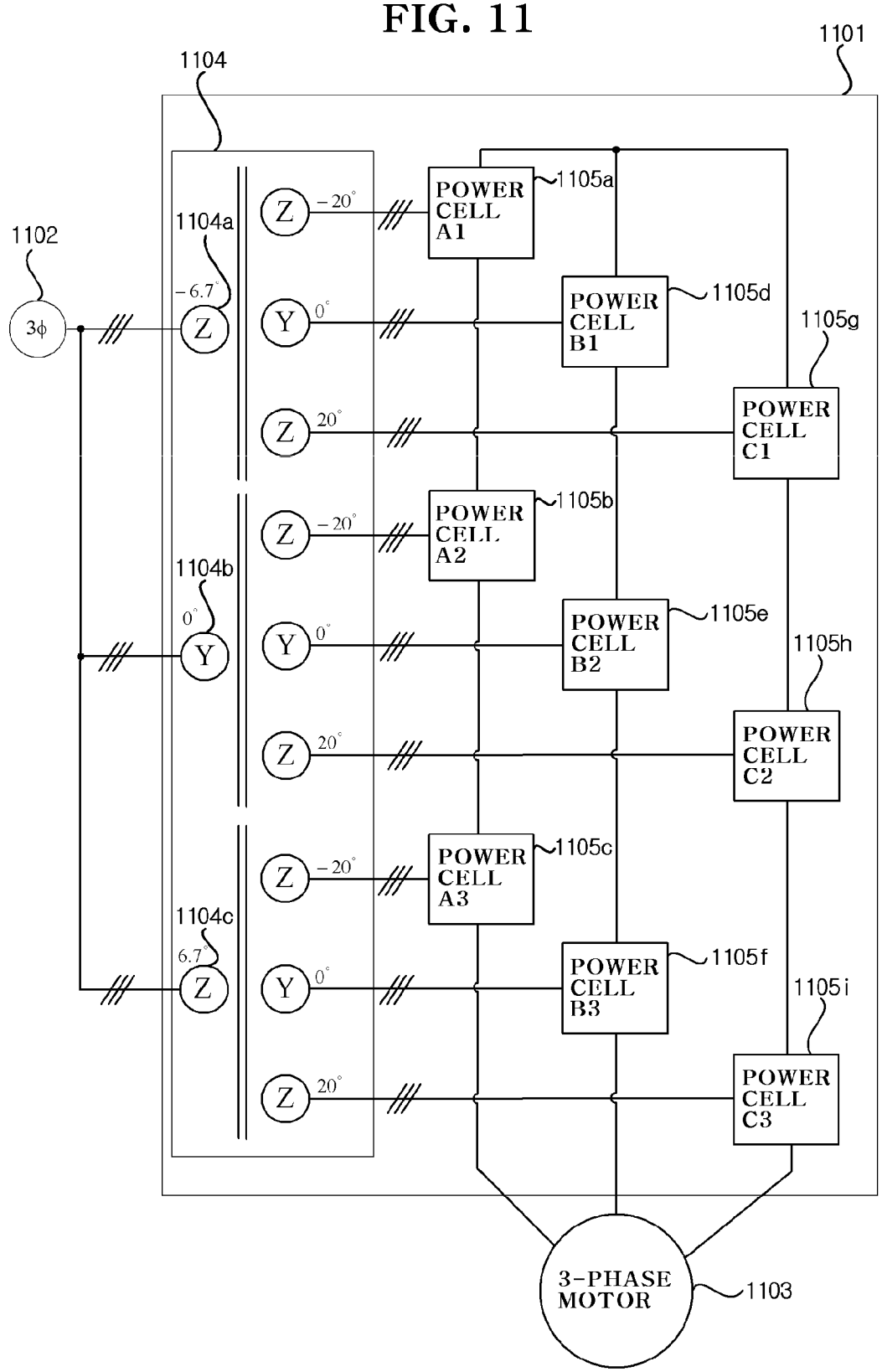
FIG. 11 is a circuit diagram illustrating an inverter system according to a first exemplary embodiment of the present disclosure.

FIG. 11 is a circuit diagram illustrating an inverter system according to a first exemplary embodiment of the present disclosure.

Referring to FIG. 11, the multi-level medium voltage inverter system using a phase shift transformer according to the first exemplary embodiment of the present disclosure uses three unit power cells for each phase of a motor (1103).

The multi-level medium voltage inverter system (1101) according to the first exemplary embodiment of the present disclosure includes nine unit power cells (1105a~1105i) and a phase shift transformer (1104). A voltage supplier (1102) provides a voltage whose root mean square value is 600 volt or over. The 3-phase motor (1103) is a 3-phase motor which is a load of the inverter system (1101). A phase angle may be changed according to the application method of the phase shift transformer (1104).

The modularized phase shift transformer (1104) according to the exemplary embodiment of the present disclosure is configured in three modules.

That is, the modularized phase shift transformer (1104) may include a plurality of modules (1104a, 1104b, 1104c) configured to provide a phase-shifted phase voltage by receiving 3-phase input voltage (1102).

A primary winding of a first module (1104a) includes a −6.7 degree, phase-shifted 3-phase connection, and a secondary winding of the first module includes −20 degree, 0 degree, 20 degree phase-shifted three insulated 3-phase connection.

A primary winding of a second module (1104b) includes a 3-phase wye connection, and a secondary winding may be identical to that of the first module (1104a). A primary winding of a third module (1104c) includes a 6.5 degree, phase-shifted 3-phase connection, and a secondary winding may be identical to that of the first module (1104a). In the exemplary embodiments of the present disclosure, an output voltage of the unit power cells (1105a~1105i) is 5 levels. Although the load motor (1103) is formed with three unit power cells for each phase, it should be apparent to the skilled in the art that the number of unit power cells may be extended as demands require.

Meanwhile, the unit power cells (1105a~1105i) may be classified into three unit power cells, i.e., a first group unit power cell (1105a, 1105d, 1105g), a second group unit power cell (1105b, 1105e, 1105h) and a third group unit power cell (1105c, 1105f, 1105i).

The first group unit power cell (1105a, 1105d, 1105g) is first to third unit power cells (1105a, 1105d, 1105g) configured to provide an output voltage of a predetermined phase by receiving a signal corresponding to each phase of a first phase voltage from the first module (1104a) to perform a predetermined inverting operation.

The second group unit power cell (1105b, 1105e, 1105h) is fourth to sixth unit power cells (1105b, 1105e, 1105h) configured to provide an output voltage of a predetermined phase by receiving a signal corresponding to each phase of a second phase voltage from the second module (1104b) to perform a predetermined inverting operation.

The third group unit power cell (1105c, 1105f, 1105i) is seventh to ninth unit power cells (1105c, 1105f, 1105i) configured to provide an output voltage of a predetermined phase by receiving a signal corresponding to each phase of a third phase voltage from the third module (1104c) to perform a predetermined inverting operation.

At this time, one of the first group unit power cell (1105a, 1105d, 1105g), one of the second group power unit cell (1105b, 1105e, 1105h) and one of the third group unit power cell (1105c, 1105f, 1105i) are paired to provide an output voltage of same phase.

That is, outputs of the unit power cells (1105a, 1105b, 1105c) are serially connected to output an 'a' phase voltage of the 3-phase load motor, and the unit power cells (1105d, 1105e, 1105f) output a 'b' phase voltage, and the unit power cells (1105g, 1105h, 1105i) output a 'c' phase voltage. The unit power cells (1105a, 1105d, 1105g) are connected to an output of the first module (1104a), the unit power cells (1105b, 1105e, 1105h) are connected to an output of the second module (1104b), and the unit power cells (1105c, 1105f, 1105i) are connected to an output of the third module (1104c).

Figure 12:
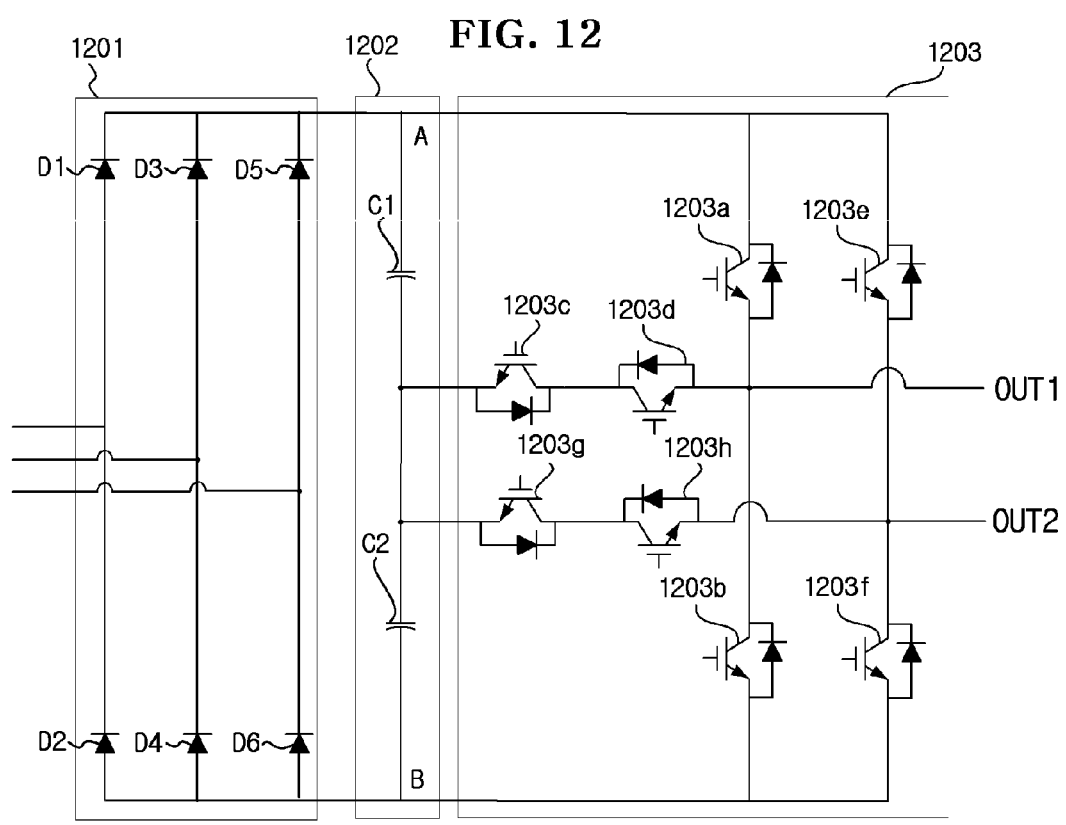
FIG. 12 is a circuit diagram illustrating a unit power cell of FIG. 11.

FIG. 12 is a circuit diagram illustrating a unit power cell of FIG. 11.

Referring to FIG. 12, the unit power cell includes a 3-phase diode rectifier (1201), a smoothing unit (1202) and an inverter unit (1203).

The smoothing unit (1202) includes two capacitors (C1, C2), and is connected to an output of the diode rectifier (1201), where the connection is serial but the connection may be serially or parallel configured. The inverter unit (1203) is a single phase T-type NPC (Neutral Point Clamped) inverter.

Switch units (1203a, 1203b, 1203c, 1203d) may form a leg, and switch units (1203e, 1203f, 1203g, 1203h) may form another leg to allow output voltages (OUT1, OUT2) to be synthesized according to a potential difference between two legs.

The rectifier (1201) provides a first rectification voltage that is rectified by receiving a first phase of the first phase voltage. The smoothing unit (1202) receives the first rectification voltage rectified by the rectifier (1201) to provide a voltage of respectively different level to mutually different first to third nodes. The inverter unit (1203) may be formed with a plurality of switch units for transmitting three levels of voltages provided by the smoothing unit (1202). The inverter unit (1203) may include a first switch unit (1203a) interposed between the first node and the first output terminal (OUT1), second switch units (1203c, 1203d) interposed between the second node and the first output terminal (OUT1), a third switch unit (1203b) interposed between the third node and the first output terminal (OUT1), a fourth switch unit (1203e) interposed between the first node and the second output terminal (OUT2), fifth switch units (1203g, 1203h) interposed between the second node and the second output terminal (OUT2), and a sixth switch unit (1203f) interposed between the third node and the second output terminal (OUT2).

The first to sixth switch units (1203a, 1203b, 1203c, 1203d, 1203e, 1203f, 1203g) may be configured by including power semiconductors and diodes.

The second switch units (1203c, 1203d) may be configured by including a first diode (1203c) having a current flow directivity from the second node to the first output terminal (OUT1), a first power semiconductor (1203c) having a current flow directivity reverse from that of the first diode and connecting one side to the other side of the first diode, a second diode (1203d) having a current flow directivity reverse from that of the first diode and serially connected to the first diode, and a second power semiconductor (1203d) having a current flow directivity reverse from that of the first power semiconductor and connecting one side to the other side of the second diode.

The first switch unit (1203a) may be embodied by including a first diode having a current flow directivity from the first output terminal (OUT1) to the first node, and a first power semiconductor having a current flow directivity reverse from that of the first diode and connecting one side to the other side of the first diode.

The third switch unit (1203b) may include a second diode having a current flow directivity from the third node to the first output terminal (OUT1), and a second power semiconductor having a current flow directivity reverse from that of the second diode and connecting one side to the other side of the second diode.

The fifth switch units (1203g, 1203h) may include a first diode (1203g) having a current flow directivity from the second node to the second output terminal (OUT2), a first power semiconductor (1203g) having a current flow directivity reverse from that of the first diode and connecting one side to the other side of the first diode, a second diode (1203f) having a current flow directivity reverse from that of the first node and serially connected to the first diode, and a second power semiconductor (1203f) having a current flow directivity reverse from that of the first power semiconductor and connecting one side to the other side of the second diode.

The fourth switch unit (1203e) may include a first diode having a current flow directivity from the second output terminal (OUT2) to the first node, and a first power semiconductor having a current flow directivity reverse from that of the first diode and connecting one side to the other side of the first diode.

The sixth switch unit (1203f) may include a second diode having a current flow directivity from the third node to the second output terminal (OUT2), and a second power semiconductor having a current flow directivity reverse from that of the second diode and connecting one side to the other side of the second diode.

The smoothing unit (1202) may include serially-connected first and second capacitors (C1, C2). The first and second capacitors (C1, C2) receive a first rectification voltage through one side and the other side, where one side of the first and second capacitors (C1, C2), common node and the other side node are arranged as first to third nodes.

The rectifier (1201) may include first and second diodes (D1, D2) connected to one side and the other side of the first and second capacitors, and receiving a first phase voltage of an input voltage through a common node, third and fourth diodes (D3, D4) connecting one side to the other side of the first and second diodes and receiving a second phase voltage of an input voltage through a common node, and fifth and sixth diodes (D5, D6) connecting one side to the other side of the first and second capacitors, and receiving a third phase voltage of input voltage through a common node.

Figure 13:
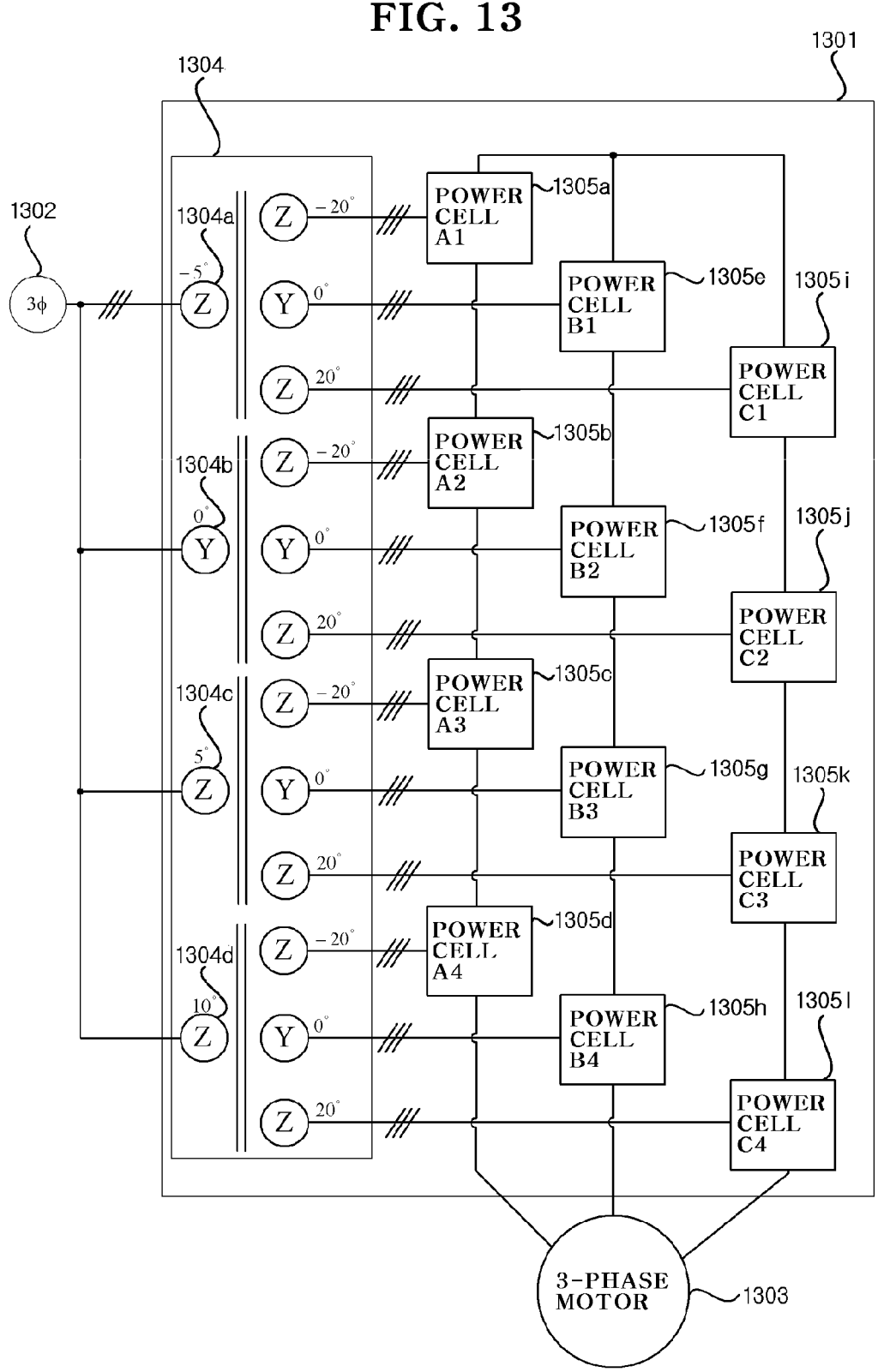
FIGS. 13 and 14 are block diagrams illustrating an inverter system according to second and third exemplary embodiments of the present disclosure.
Figure 14:
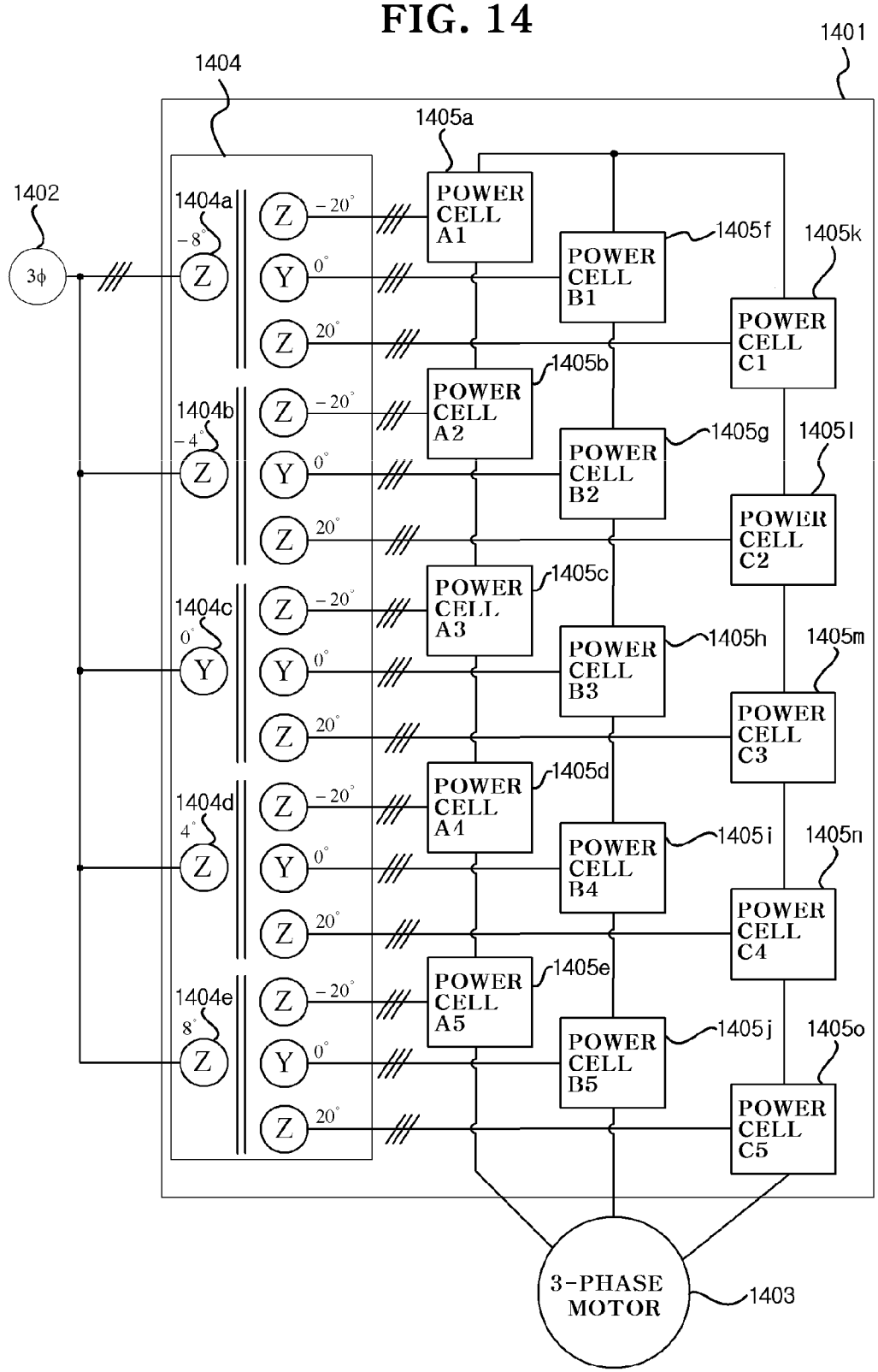

FIGS. 13 and 14 are block diagrams illustrating an inverter system according to second and third exemplary embodiments of the present disclosure, where FIG. 13 illustrates an inverter system formed with four unit power cells for each phase of a motor using a unit power cell of FIG. 12.

Referring to FIG. 13, an inverter system (1301) includes a phase shift transformer (1304), and unit power cells (1305a~1305l). The phase shift transformer (1304) receives a voltage from a 3-phase power supplier (1302) and provides the voltage to the unit power cells (1305a~1305l). A motor is a 3-phase motor (1303) which is a load of the inverter system (1303). The 3-phase power supplier (1302) is a 3-phase power having a root mean square value of an inputted line-to-line voltage ranging from 600 V or over.

The phase shift transformer according to the exemplary embodiment of the present disclosure is formed with four modules. A primary winding of a first module (1304a) includes a −5 degree, phase-shifted 3 phase connection, and a secondary winding includes a −20 degree, 0 degree, and 20 degree phase-shifted 3-phase connection. A primary winding of a second module (1304b) includes a 3-phase wye connection, and a secondary winding may be identical to that of the first module (1304a).

A primary winding of a third module (1304c) includes a 5 degree, phase-shifted 3 phase connection, and a secondary winding may be identical to that of the first module (1304a).

A primary winding of a fourth module (1304d) includes a 10 degree, phase-shifted 3 phase connection, and a secondary winding may be identical to that of the first module (1304a). Each of output voltages of unit power cells (1305a~1305l) is a 5-level.

Although the load motor (1303) is formed with three unit power cells for each phase, it should be apparent to the skilled in the art that the number of unit power cells may be extended as demands require.

The unit power cells (1305a~1305l) may be classified to first group unit power cells (1305a, 1305e, 1305g), second group unit power cells (1305b, 1305f, 1305j), third group unit power cells (1305c, 1305g, 1305k) and fourth group unit power cells (1305d, 1305h, 1305l).

The first group unit power cells (1305a, 1305e, 1305g) are first to third unit power cells (1305a, 1305e, 1305g) configured to provide an output voltage of a predetermined phase by receiving a signal corresponding to each phase of a first phase voltage from the first module (1304a) to perform a predetermined inverting operation.

The second group unit power cells (1305b, 1305f, 1305j) are fourth to sixth unit power cells (1305b, 1305f, 1305j) configured to provide an output voltage of a predetermined phase by receiving a signal corresponding to each phase of a second phase voltage from the second module (1304b) to perform a predetermined inverting operation.

The third group unit power cells (1305c, 1305g, 1305k) are seventh to ninth unit power cells (1305c, 1305g, 1305k) configured to provide an output voltage of a predetermined phase by receiving a signal corresponding to each phase of a third phase voltage from the third module (1304c) to perform a predetermined inverting operation.

The fourth group unit power cells (1305d, 1305h, 1305l) are tenth to twelfth unit power cells (1305d, 1305h, 1305l) configured to provide an output voltage of a predetermined phase by receiving a signal corresponding to each phase of a third phase voltage from the fourth module (1304d) to perform a predetermined inverting operation.

At this time, one of the first group unit power cells (1305a, 1305e, 1305g), one of the second group power unit cells (1305b, 1305f, 1305j), one of the third group unit power cells (1305c, 1305g, 1305k) and one of the fourth group unit power cells (1305d, 1305h, 1305l) are paired to provide an output voltage of same phase.

That is, outputs of the unit power cells (1305a, 1305b, 1305c, 1305d) are serially connected to output an 'a' phase voltage of the 3-phase load motor, and the unit power cells (1305e, 1305f, 1305g, 1305h) output a 'b' phase voltage, and the unit power cells (1305i, 1305j, 1305k, 1305l) output a 'c' phase voltage. The unit power cells (1305a, 1305e, 1305i) are connected to an output of the first module (1304a), the unit power cells (1305b, 1305f, 1305j) are connected to an output of the second module (1304b), the unit power cells (1305c, 1305g, 1305k) are connected to an output of the third module (1304c), and the unit power cells (1305d, 1305h, 1305l) are connected to an output of the fourth module (1304d).

FIG. 14 illustrates an inverter system formed with five unit power cells for each phase of a motor using a unit power cell of FIG. 12.

Referring to FIG. 14, an inverter system (1401) includes a phase shift transformer (1404), and unit power cells (1405a~1405o). The phase shift transformer (1404) receives a voltage from a 3-phase power supplier (1402) and provides the voltage to the unit power cells (1405a~1405o). A motor is a 3-phase motor (1403) which is a load of the inverter system (1401). The 3-phase power supplier (1402) is a 3-phase power having a root mean square value of an inputted line-to-line voltage ranging from 600 V or over.

The phase shift transformer (1404) according to the exemplary embodiment of the present disclosure is formed with five modules. A primary winding of a first module (1404a) includes a −8 degree, phase-shifted 3 phase connection, and a secondary winding includes a −20 degree, 0 degree, and 20 degree phase-shifted 3-phase connection. A primary winding of a second module (1404b) includes a −4 degree, phase-shifted 3-phase connection, and a secondary winding may be identical to that of the first module (1404a).

A primary winding of a third module (1404c) includes a wye connection, and a secondary winding may be identical to that of the first module (1404a).

A primary winding of a fourth module (1404d) includes a 4 degree, phase-shifted 3 phase connection, and a secondary winding may be identical to that of the first module (1404a). A primary winding of a fifth module (1404e) includes a 4 degree, phase-shifted 3 phase connection, and a secondary winding may be identical to that of the first module (1404a). Each of output voltages of unit power cells (1405a~1405o) is a 5-level.

Although the load motor (1403) is formed with five unit power cells for each phase, it should be apparent to the skilled in the art that the number of unit power cells may be extended as demands require.

The unit power cells (1405a~1405o) may be classified to first group unit power cells (1405a, 1405f, 1405k), second group unit power cells (1405b, 1405g, 1405l), third group unit power cells (1405c, 1405h, 1405m), fourth group unit power cells (1405d, 1405i, 1405n), and fifth group unit power cells (1405e, 1405j, 1405o).

The first group unit power cells (1405a, 1405f, 1405k) are first to third unit power cells (1405a, 1405f, 1405k) configured to provide an output voltage of a predetermined phase by receiving a signal corresponding to each phase of a first phase voltage from the first module (1404a) to perform a predetermined inverting operation.

The second group unit power cells (1405b, 1405g, 1405l) are fourth to sixth unit power cells (1405b, 1405g, 1405l) configured to provide an output voltage of a predetermined phase by receiving a signal corresponding to each phase of a second phase voltage from the second module (1404b) to perform a predetermined inverting operation.

The third group unit power cells (1405c, 1405h, 1405m) are seventh to ninth unit power cells (1405c, 1405h, 1405m) configured to provide an output voltage of a predetermined phase by receiving a signal corresponding to each phase of a third phase voltage from the third module (1404c) to perform a predetermined inverting operation.

The fourth group unit power cells (1405d, 1405i, 1405n) are tenth to twelfth unit power cells (1405d, 1405i, 1405n) configured to provide an output voltage of a predetermined phase by receiving a signal corresponding to each phase of a fourth phase voltage from the fourth module (1404d) to perform a predetermined inverting operation.

The fifth group unit power cell (1405e, 1405j, 1405o) are thirteenth to fifteenth unit power cells (1405e, 1405j, 1405o) configured to provide an output voltage of a predetermined phase by receiving a signal corresponding to each phase of a fifth phase voltage from the fifth module (1404e) to perform a predetermined inverting operation.

At this time, one of the first group unit power cells (1405a, 1405f, 1405k), one of the second group power unit cells (1405b, 1405g, 1405l), one of the third group unit power cells (1405c, 1405h, 1405m), one of the fourth group unit power cells (1405d, 1405i, 1405n), and one of the fifth group unit cells (1405e, 1405j, 1405o) are paired to provide an output voltage of same phase.

That is, outputs of the unit power cells (1405a, 1405b, 1405c, 1405d, 1405e) are serially connected to output an 'a' phase voltage of the 3-phase load motor, and the unit power cells (1405f, 1405g, 1405h, 1405i, 1405j) output a 'b' phase voltage, and the unit power cells (1405k, 1405l, 1405m, 1405n, 1405o) output a 'c' phase voltage. The unit power cells (1405a, 1405f, 1405k) are connected to an output of the first module (1404a), the unit power cells (1405b, 1405g, 1405l) are connected to an output of the second module (1404b), the unit power cells (1405c, 1405h, 1405m) are connected to an output of the third module (1404c), the unit power cells (1405d, 1405i, 1405n) are connected to an output of the fourth module (1404d), and the unit power cells (1405e, 1405j, 1405o) are connected to an output of the fifth module (1404e).

The inverter system according to the exemplary embodiment of the present disclosure thus far described modularizes the phase shift transformer of a single unit to be used for a multilevel medium voltage inverter having unit power cells.

A phase shift angle of secondary winding of the phase shift transformer according to the present disclosure is determined by the Equations 1 and 2. Furthermore, a phase shift angle of primary winding of the phase shift transformer according to the present disclosure is determined by the Equation 3.

$$\alpha prim = 360/Nm\_T * 1/Nsec\_out * 1/Ndiode\_pulse [degree] \quad (3)$$

where, Nm_T is the number of modules of the phase shift transformer, Nsec_out is the number of outputs at the secondary winding of a single phase shift transformer, and Ndiode_pulse is the number of pulses of diode rectifier.

For example, in case of FIG. 11, Nm_T is 3, Nsec_out is 6, and Ndiode_pulse is 6, whereby αprim is 6.7 degree. It is preferable that, based on the primary winding of the phase shift transformer being 0 degree, the phase shifting be made in the form of multiple of +−a prim.

Capacity of modularized phase shift transformer according to the exemplary embodiment of the present disclosure has a relationship with capacity of the conventional single unit-type phase shift transformer in the following manner of Equation 4.

$$Sm\_T = Sconv/Nm\_T \quad (4)$$

where, Sm_T is an apparent power of each modularized phase shift transformer according to the present disclosure, and Sconv is an apparent power of the conventional single unit-type phase shift transformer.

The modularized phase shift transformer is advantageous over the conventional single unit type phase shift transformer in that capacity is small to reduce a winding window and to reduce an entire size and weight. As a result, size and weight of the phase shift transformer are reduced to reduce the size and weight of an entire system.

Furthermore, the modularized phase shift transformer according to the present disclosure has a transformer as small as Nm_T, resultantly providing a layout freedom for an entire system and flexibility in design.

Although the conventional single unit type phase shift transformer is inoperable in an entire system if the primary winding is faulted, the modularized phase shift transformer according to the present disclosure is advantageous in that if a primary winding of one module at the modularized phase shift transformer is faulted, a power cell connected to the faulted module is detoured to enable a continued operation under a reduced output.

The modularized phase shift transformer in a multi-level medium voltage inverter according to the present disclosure is such that redundancy of an entire system can be enhanced due to the structural characteristics thus described. There may be generated a current distortion at an input terminal.

Now, an inverter unit of the unit power cell in the inverter system according to the present disclosure will be described. As illustrated in FIG. 12, the inverter unit according to the present disclosure includes a single T-type NPS inverter.

Referring to FIG. 12, each leg of an inverter unit (1203) of a unit power cell includes four switch units (1203a, 1203b, 1203c, 1203d), and an output pole voltage is defined by operation of the switch units. The switch units (1203a and 1203c) cannot be simultaneously turned on, and the switch units (1203b and 1203d) cannot be simultaneously turned on either. The operation of the switch units (1203a and 1203b) is such that when mutually independently required output pole voltage is positive, the switch units (1203a and 1203c) operate, and when mutually independently required output pole voltage is negative, the switch units (1203b and 1203d) operate.

If each voltage of serially-connected capacitors (C1, C2) at a DC terminal of the smoothing unit (1202) is defined as E, an output pole voltage is positive, the switch unit (1203a) is turned on and the switch unit (1203c) is turned off, an output pole voltage of E is outputted, and if the switch unit (1203a) is turned off, and the switch unit (1203c) is turned on, the output pole voltage is zero.

If the output pole voltage is negative, the switch unit (1203b) is turned on and the switch unit (1203d) is turned off, an output pole voltage of −E is outputted, and if the switch unit (1203b) is turned off and the switch unit (1203d) is turned on, an output pole voltage of zero is outputted. If the output pole voltage thus defined is used, the outputted line-to-line voltages of each power unit cells are 5 levels of 2E, E, 0, −E, −2E.

FIGS. 15 to 20 illustrate a conduction of a power semiconductor in response to a current direction when the output pole voltages are determined as E, 0, −E. That is, FIGS. 15 to 20 are circuit diagrams illustrating an operation of an inverter unit illustrated in FIG. 12.

Figure 15:
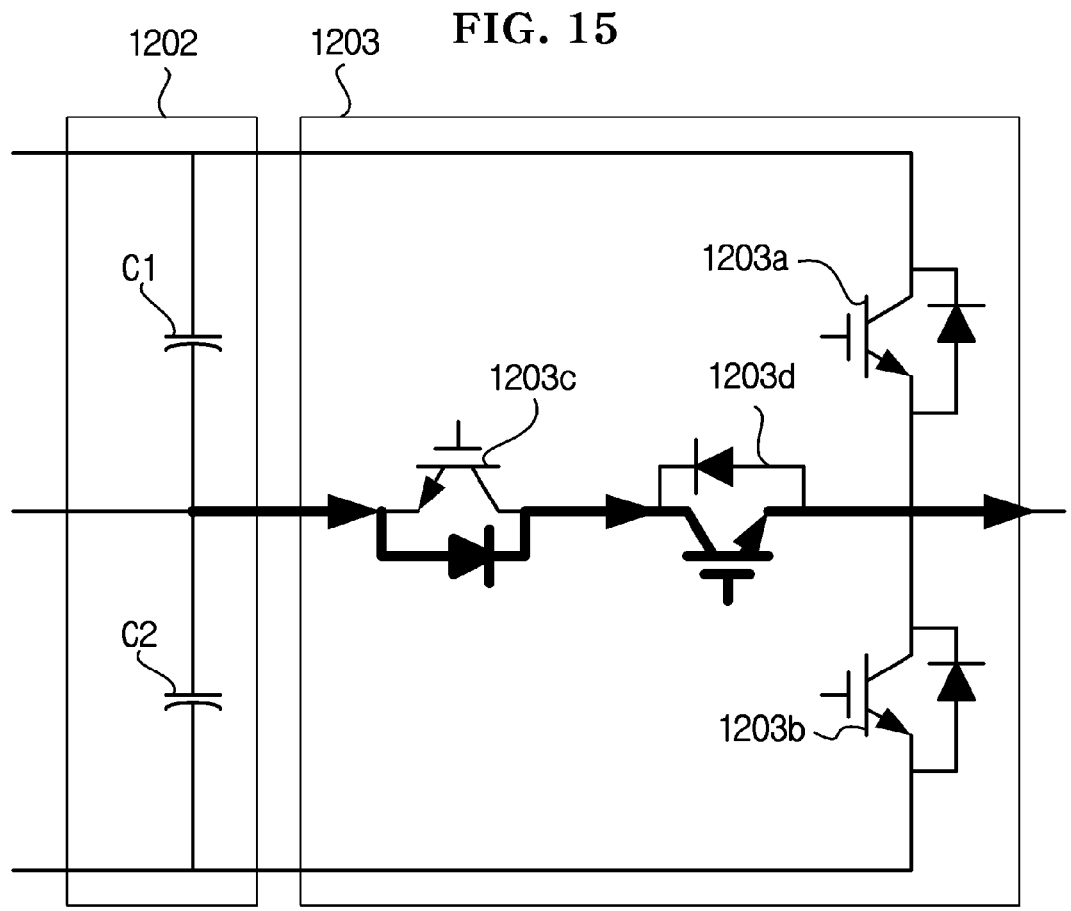
FIGS. 15 to 20 are circuit diagrams illustrating an operation of an inverter unit illustrated in FIG. 12.
Figure 16:
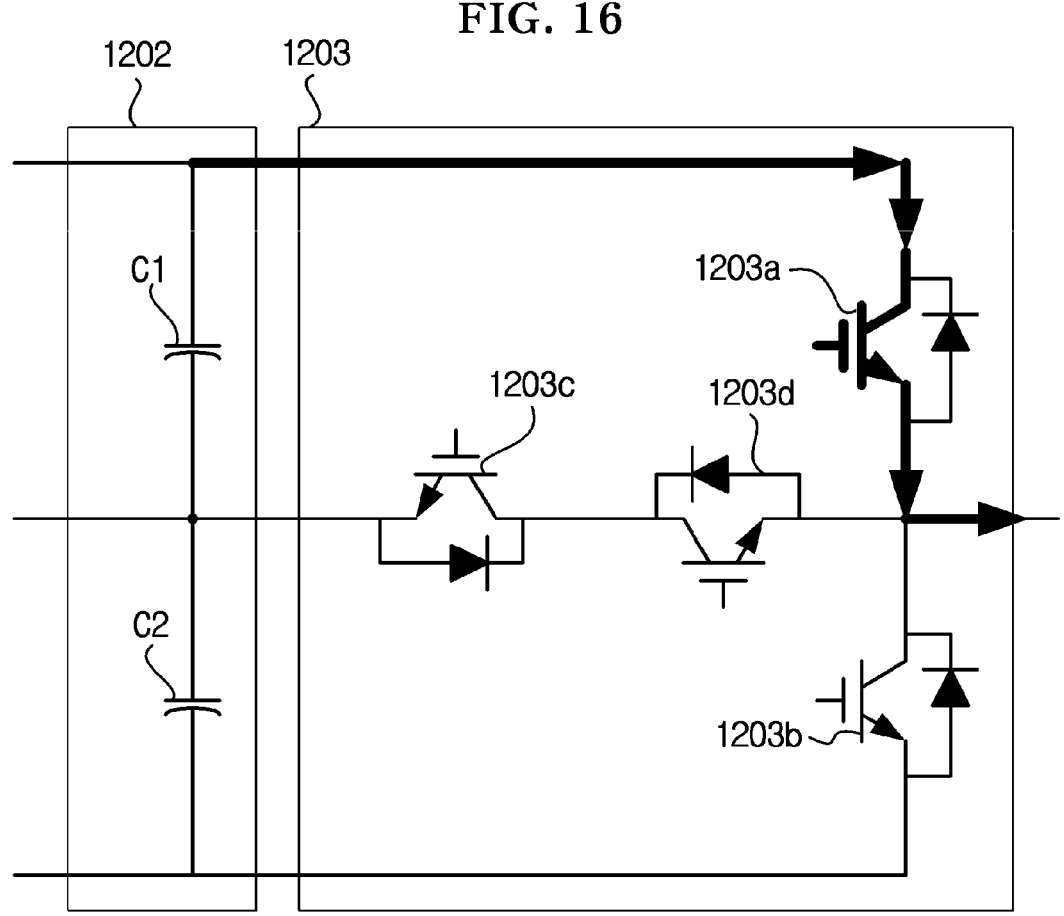
Figure 17:
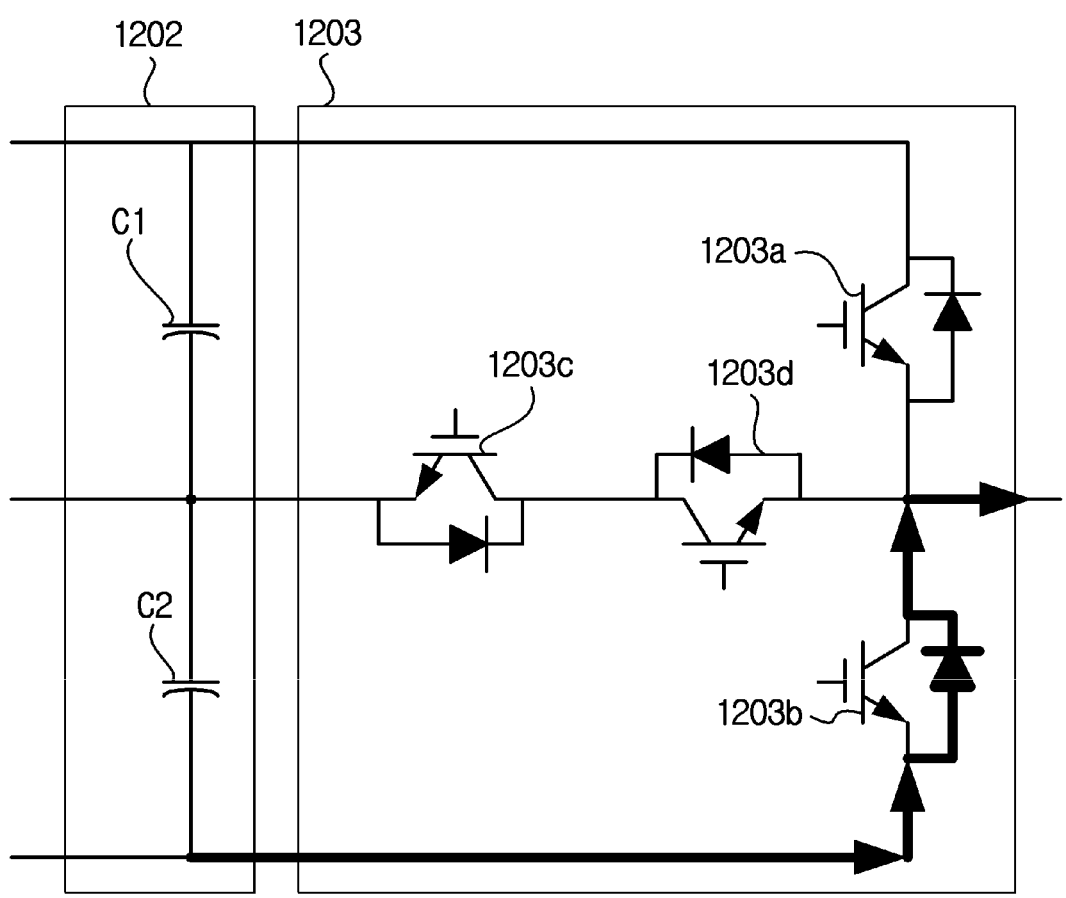

FIG. 15 shows a switch unit that is conducted when an output pole voltage is 0, and an output current is positive, FIG. 16 shows a switch unit that is conducted when an output pole voltage is E, and an output current is positive, and FIG. 17 shows a switch unit that is conducted when an output pole voltage is −E, and an output current is positive.

One diode and one switch unit are conducted in FIG. 15, one switch unit is conducted in FIG. 16 and one diode is conducted in FIG. 17.

Figure 18:
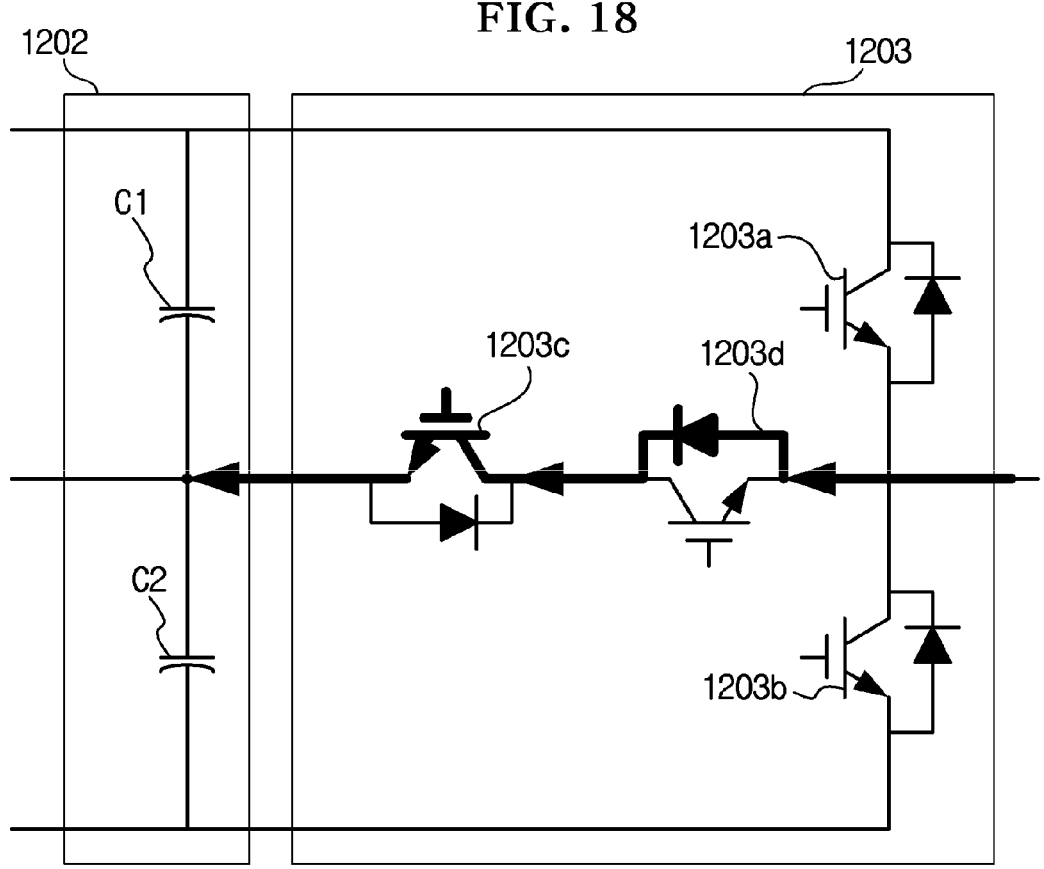
Figure 19:
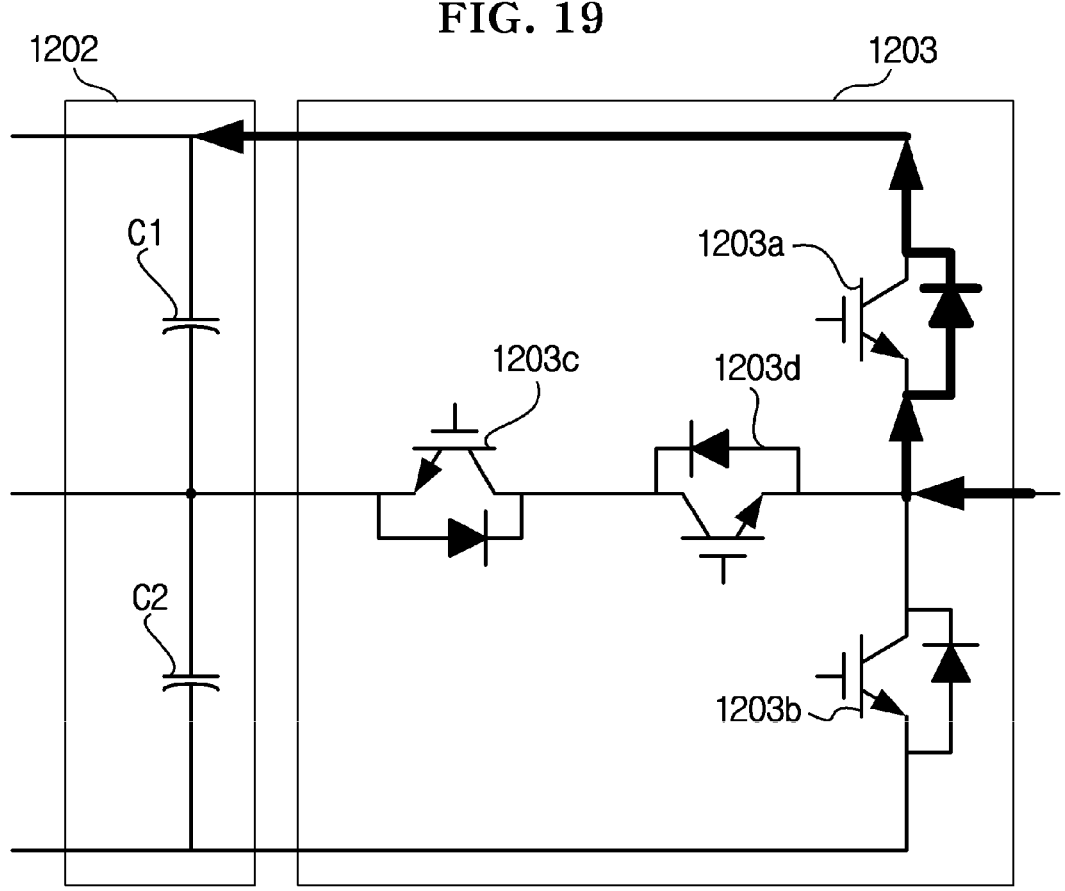
Figure 20:
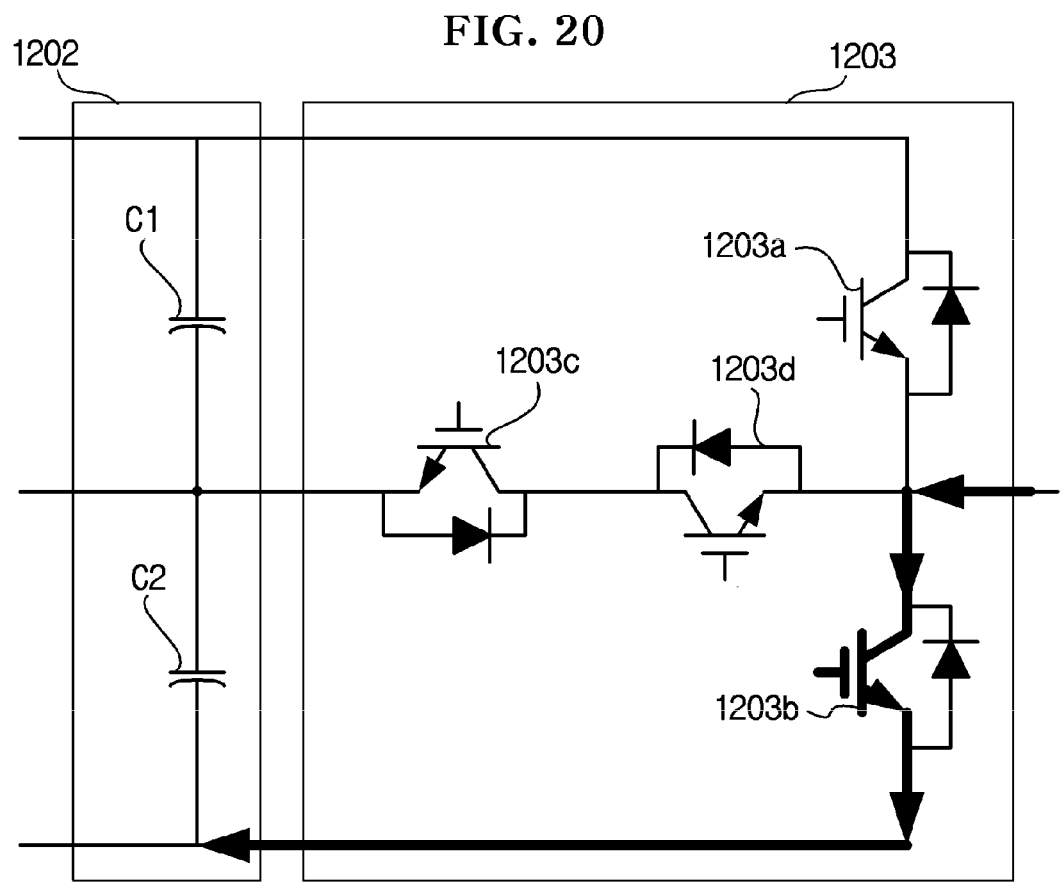

FIG. 18 shows a switch unit that is conducted when an output pole voltage is 0, and an output current is negative, FIG. 19 shows a switch unit that is conducted when an output pole voltage is E, and an output current is negative, and FIG. 20 shows a switch unit that is conducted when an output pole voltage is −E, and an output current is negative.

One diode and one switch unit are conducted in FIG. 18, one diode is conducted in FIG. 19 and one switch unit is conducted in FIG. 20.

It can be noted that, although one switch and one diode are conducted in FIGS. 15 and 18, only one diode or only one switch unit is conducted in other remaining configurations of drawings, such that the average number of conducted power semiconductors is reduced over that of FIGS. 5 to 10, whereby loss caused by the power semiconductor is reduced to increase an efficiency of an entire system and to resultantly reduce the size for heat radiation. The power semiconductors according to the exemplary embodiments of the present disclosure may include IGBTs or power MOSFETs.

The inverter system according to the present disclosure thus described can increase a layout freedom for an entire system and reduce the size and weight of an entire system, which may be accomplished by modularization of a phase shift transformer used for an input terminal of the multilevel medium voltage inverter, and by configuration of 6-pulse diodes for the input terminal of the unit power cells.

Furthermore, the modularized phase shift transformer in a multi-level medium voltage inverter according to the present disclosure is advantageous in that redundancy of an entire system can be enhanced due to the structural characteristics thus described. The inverter system according to the present disclosure can also increase the operational efficiency, which can be accomplished by the reduced number of power semiconductors that are averagely conducted and due to the changed structural characteristics of the inverter unit. If the conduction loss of the inverter system is reduced, a radiation design can be made easy to reduce the weight and size of an entire system.

Although the present disclosure has been described in detail with reference to the foregoing embodiments and advantages, many alternatives, modifications, and variations will be apparent to those skilled in the art within the metes and bounds of the claims. Therefore, it should be understood that the above-described embodiments are not limited by any of the details of the foregoing description, unless otherwise specified, but rather should be construed broadly within the scope as defined in the appended claims

What is claimed is:

1. A multilevel inverter, the multilevel inverter comprising:
   a modularized phase-shift transformer including a plurality of modules to provide a phase shifted voltage by receiving a 3-phase input voltage;
   a plurality of first group unit power cells configured to provide a first output voltage of predetermined phase by performing a predetermined inverting operation by receiving a signal corresponding to each phase of a first phase voltage from any one module in the plurality of modules;
   a plurality of second group unit power cells configured to provide a second output voltage of predetermined phase by performing a predetermined inverting operation through receipt of a signal corresponding to each phase of a second phase voltage from any one module in the plurality of modules;
   a plurality of third group unit power cells configured to provide a third output voltage of predetermined phase by performing a predetermined inverting operation by receiving a signal corresponding to each phase of a third phase voltage from any one module in the plurality of modules;
   wherein one of the first group unit power cells, one of the second group unit power cells and one of the third group unit power cells are paired to provide an output voltage of same phase,
   wherein each of the first to third group unit power cells comprise first to third unit power cells, and
   wherein the unit power cells comprise comprises a rectifier configured to provide a first rectifying voltage rectified by receiving a first phase of the first phase voltage, a smoothing unit configured to provide voltages of mutually different levels to mutually different first to third nodes by receiving the first rectifying voltage rectified by the rectifier, and an inverter unit formed with a plurality of switches for transmitting voltages of three levels provided by the smoothing unit, wherein the inverter unit comprises a first switch unit interposed between the first node and a first output terminal, second switch units interposed between the second node and the first output terminal, a third switch unit interposed between the third node and the first output terminal, a fourth switch unit interposed between the first node and a second output terminal, fifth switch units interposed between the second node and the second output terminal and a sixth switch unit interposed between the third node and the second output terminal.

2. The multilevel inverter of claim 1, wherein the modularized phase shift transformer comprises a first module configured to provide a first phase voltage phase-shifted by a primary winding and a secondary winding by receiving a 3-phase input voltage, a second module configured to provide a second phase voltage phase-shifted by a primary winding having a different phase with the primary winding of the first m and a secondary winding by receiving the 3-phase input voltage, and a third module configured to provide a third phase voltage phase-shifted by a primary winding having a different phase with the primary winding of the first and second module and a secondary winding by receiving the 3-phase input voltage.

3. The multilevel inverter of claim 2, wherein the primary winding of the second module is a 3-phase wye connection, and each of the primary windings of the first and third modules has a phase value of equal absolute value, and is wound to have a positive phase and a negative phase.

4. The multilevel inverter of claim 2, wherein the first to third modules are configured to be symmetrical.

5. The multilevel inverter of claim 1, wherein the plurality of first group unit power cells comprises the first to third unit power cells configured to provide the first output voltage of a predetermined phase by performing a predetermined inverting operation though receipt of a signal corresponding to each phase of the first phase voltage, the plurality of second group unit power cells comprises fourth to sixth unit power cells configured to provide the second output voltage of a predetermined phase by performing a predetermined inverting operation though receipt of a signal corresponding to each phase of the second phase voltage, and the plurality of third group unit power cells comprises seventh to ninth unit power cells configured to provide the third output voltage of a predetermined phase by performing a predetermined inverting operation though receipt of a signal corresponding to each phase of the third phase voltage, wherein one of the first to third group unit power cells, one of the fourth to sixth group unit power cells and one of the seventh to ninth group unit power cells are paired to provide an output voltage of same phase.

6. The multilevel inverter of claim 1 wherein the first to sixth switch units comprise a power semiconductor and a diode.

7. The multilevel inverter of claim 1 wherein the second switch units comprise a first diode having a current directivity from the second node to the first output terminal, a first power semiconductor having a current flow directivity reverse from that of the first diode, a second diode having a current flow directivity reverse from that of the first diode and serially connected to the first diode, and a second power semiconductor having a current flow directivity reverse from that of the first power semiconductor and connecting one side of the second diode to the other side of the second diode.

8. The multilevel inverter of claim 1, wherein the first switch unit comprises a first diode having a current flow directivity from the first output terminal to the first node, and a first power semiconductor having a current flow directivity reverse from that of the first diode and connecting one side of the first diode to the other side of the first diode.

9. The multilevel inverter of claim 1, wherein the third switch unit comprises a second diode having a current flow directivity from the third node to the first output terminal, and a second power semiconductor having a current flow directivity reverse from that of the second diode and connecting one side of the second diode to the other side of the second diode.

10. The multilevel inverter of claim 1, wherein the fifth switch unit comprises a first diode having a current directivity from the second node to the second output terminal, a first power semiconductor having a current flow directivity reverse from that of the first diode and connecting one side to the other side of the first diode, a second diode having a current flow directivity reverse from that of the first diode and serially connected to the first diode, and a second power semiconductor having a current flow directivity reverse from that of the first power semiconductor and connecting one side to the other side of the second diode.

11. The multilevel inverter of claim 1, wherein the fourth switch unit comprises a first diode having a current flow directivity from the second output terminal to the first node, and a first power semiconductor having a current flow directivity reverse from that of the first diode and connecting one side of the first diode to the other side of the first diode.

12. The multilevel inverter of claim 11, wherein the sixth switch unit comprises a second diode having a current flow directivity from the third node to the second output terminal, and a second power semiconductor having a current flow directivity reverse from that of the second diode and connecting one side of the second diode to the other side of the second diode.

13. The multilevel inverter of claim 1, wherein the smoothing unit comprises serially-connected first and second capacitors, wherein the first and second capacitors receive the first rectifying voltage from one side and the other side, and wherein one side node, a common node and the other side node of the first and second capacitors are respectively the first to third nodes.

14. The multilevel inverter of claim 13, wherein the rectifier comprises first and second diodes connecting one sides and the other sides of the first and second capacitors, and receiving a first phase voltage of the first phase voltage through a common node, third and fourth diodes connecting one sides and the other sides of the first and second capacitors and receiving a second phase voltage of the first phase voltage through a common node, and fifth and sixth diodes connecting one side and the other side of the first capacitor and receiving a third phase voltage of the first phase voltage through a common node.

15. The multilevel inverter of claim 1, wherein the inverter unit comprises a single phase T-type NPC (Neutral Point Clamed) inverter.

16. The multilevel inverter of claim 2, wherein the modularized phase shift transformer further comprises a fourth module configured to provide a fourth phase-shifted phase voltage using a primary winding having a different phase with the primary winding of the first to third module and a secondary winding by receiving the 3-phase input voltage, and a plurality of fourth group unit power cells configured to provide a fourth output voltage of a predetermined phase by performing a predetermined inverting operation through receipt of a signal corresponding to each phase of the fourth phase voltage, wherein one of the first group unit power cells, one of the second group unit power cells, one of the third group unit power cells and one of the fourth group unit power cells are paired to provide an output voltage of same phase.

17. The multilevel inverter of claim 16, wherein the modularized phase shift transformer further comprises a fifth module configured to provide a fifth phase-shifted phase voltage using a primary winding having a different phase with the primary winding of the first to fourth modules and a secondary winding by receiving the 3-phase input voltage, and a plurality of fifth group unit power cells configured to provide a fifth output voltage of a predetermined phase by performing a predetermined inverting operation through receipt of a signal corresponding to each phase of the fifth phase voltage, wherein one of the first group unit power cells, one of the second group unit power cells, one of the third group unit power cells, one of the fourth group unit power cells and one of the fifth group unit power cells are paired to provide an output voltage of same phase.

* * * * *